(12) United States Patent
Debnath et al.

(10) Patent No.: US 12,080,159 B2
(45) Date of Patent: Sep. 3, 2024

(54) SYSTEMS AND METHODS FOR DETECTING INTERSECTION CROSSING EVENTS USING FULL FRAME CLASSIFICATION TECHNIQUES

(71) Applicant: NETRADYNE, INC., San Diego, CA (US)

(72) Inventors: Biswarup Debnath, Howrah (IN); Suresh Babu Yanamala, Bengaluru (IN); Arvind Yedla, La Jolla, CA (US); Venkata Sreekanta Reddy Annapureddy, San Diego, CA (US)

(73) Assignee: NETRADYNE, INC., San Diego, CA (US)

( * ) Notice: Subject to any disclaimer, the term of this patent is extended or adjusted under 35 U.S.C. 154(b) by 0 days.

(21) Appl. No.: 18/288,157

(22) PCT Filed: Jun. 8, 2022

(86) PCT No.: PCT/US2022/032630
§ 371 (c)(1),
(2) Date: Oct. 24, 2023

(87) PCT Pub. No.: WO2022/261175
PCT Pub. Date: Dec. 15, 2022

(65) Prior Publication Data
US 2024/0203244 A1 Jun. 20, 2024

Related U.S. Application Data

(60) Provisional application No. 63/208,868, filed on Jun. 9, 2021.

(51) Int. Cl.
*G08G 1/01* (2006.01)
*G06V 10/44* (2022.01)
(Continued)

(52) U.S. Cl.
CPC ........... *G08G 1/0112* (2013.01); *G06V 10/44* (2022.01); *G06V 10/764* (2022.01); *G06V 20/44* (2022.01); *G06V 20/584* (2022.01); *G08G 1/0133* (2013.01)

(58) Field of Classification Search
CPC .... G08G 1/0112; G08G 1/0133; G06V 10/44; G06V 10/764; G06V 20/44; G06V 20/584
See application file for complete search history.

(56) References Cited

U.S. PATENT DOCUMENTS

| 8,370,056 B2 | 2/2013 | Trombley et al. |
| 11,897,471 B2 * | 2/2024 | Sajjadi Mohammadabadi ............ G06V 10/82 |

(Continued)

OTHER PUBLICATIONS

International Preliminary Report on Patentability in International Patent Application No. PCT/US2022/032630 dated Oct. 4, 2023 (4 pages).

(Continued)

*Primary Examiner* — John B Strege
(74) *Attorney, Agent, or Firm* — FOLEY & LARDNER LLP

(57) ABSTRACT

Disclosed herein are systems and methods for classifying traffic indicators to detect intersection crossings by a vehicle. A computing device can receive a sequence of frames captured by a capture device mounted to the vehicle, and generate an intersection status data structure for each frame in the sequence of frames using a full-frame classification model. The computing device can also classify a set of features detected in each frame using an object detection model, and detect an intersection crossing event based on the intersection status data structure of each frame and the classification of each of the set of features detected in each frame. The systems and methods described herein improve upon existing traffic light classification models by using a (Continued)

full-frame intersection classification model in connection with traditional object tracking techniques, thereby reducing false-positive crossing-event detection and improving the accuracy of classification in a variety of environmental conditions.

20 Claims, 9 Drawing Sheets

(51) Int. Cl.
  *G06V 10/764* (2022.01)
  *G06V 20/40* (2022.01)
  *G06V 20/58* (2022.01)

(56) References Cited

U.S. PATENT DOCUMENTS

| | | | | |
|---|---|---|---|---|
| 2002/0054210 | A1* | 5/2002 | Glier | G08G 1/164 |
| | | | | 348/E7.087 |
| 2010/0198488 | A1 | 8/2010 | Groitzsch et al. | |
| 2011/0095908 | A1 | 4/2011 | Nadeem et al. | |
| 2013/0253754 | A1* | 9/2013 | Ferguson | G05D 1/0231 |
| | | | | 701/28 |
| 2013/0259375 | A1* | 10/2013 | Dunlop | G06V 20/38 |
| | | | | 382/173 |
| 2020/0293796 | A1 | 9/2020 | Sajjadi Mohammadabadi et al. | |
| 2021/0097855 | A1 | 4/2021 | Annapureddy et al. | |
| 2021/0201145 | A1* | 7/2021 | Pham | G06N 3/08 |
| 2021/0264178 | A1* | 8/2021 | Qin | G06V 10/774 |
| 2022/0012507 | A1* | 1/2022 | Hong | B60W 60/001 |
| 2022/0114375 | A1* | 4/2022 | Chen | G06V 10/774 |
| 2022/0351524 | A1* | 11/2022 | Pham | G06T 11/20 |
| 2023/0166733 | A1* | 6/2023 | Sajjadi Mohammadabadi | B60W 30/095 |
| | | | | 382/104 |

OTHER PUBLICATIONS

International Search Report and Written Opinion in International Patent Application No. PCT/US2022/032630 dated Oct. 17, 2022 (15 pages).

Bravi, et al., "Detection of Stop Sign Violations From Dashcam Data," IEEE Transactions on Intelligent Transportation Systems, Jun. 2022, vol. 23, No. 6, 10 pages.

Extended European Search Report in EP Patent Application No. 22820940.9 dated Jun. 20, 2024, 9 pages.

Kaan, et al., "Multi-Task Learning for iRAP Attribute Classification and Road Safety Assessment," 2020 IEEE 23rd International Conference on Intelligent Transportation Systems (ITSC), Sep. 2020, 6 pages.

* cited by examiner

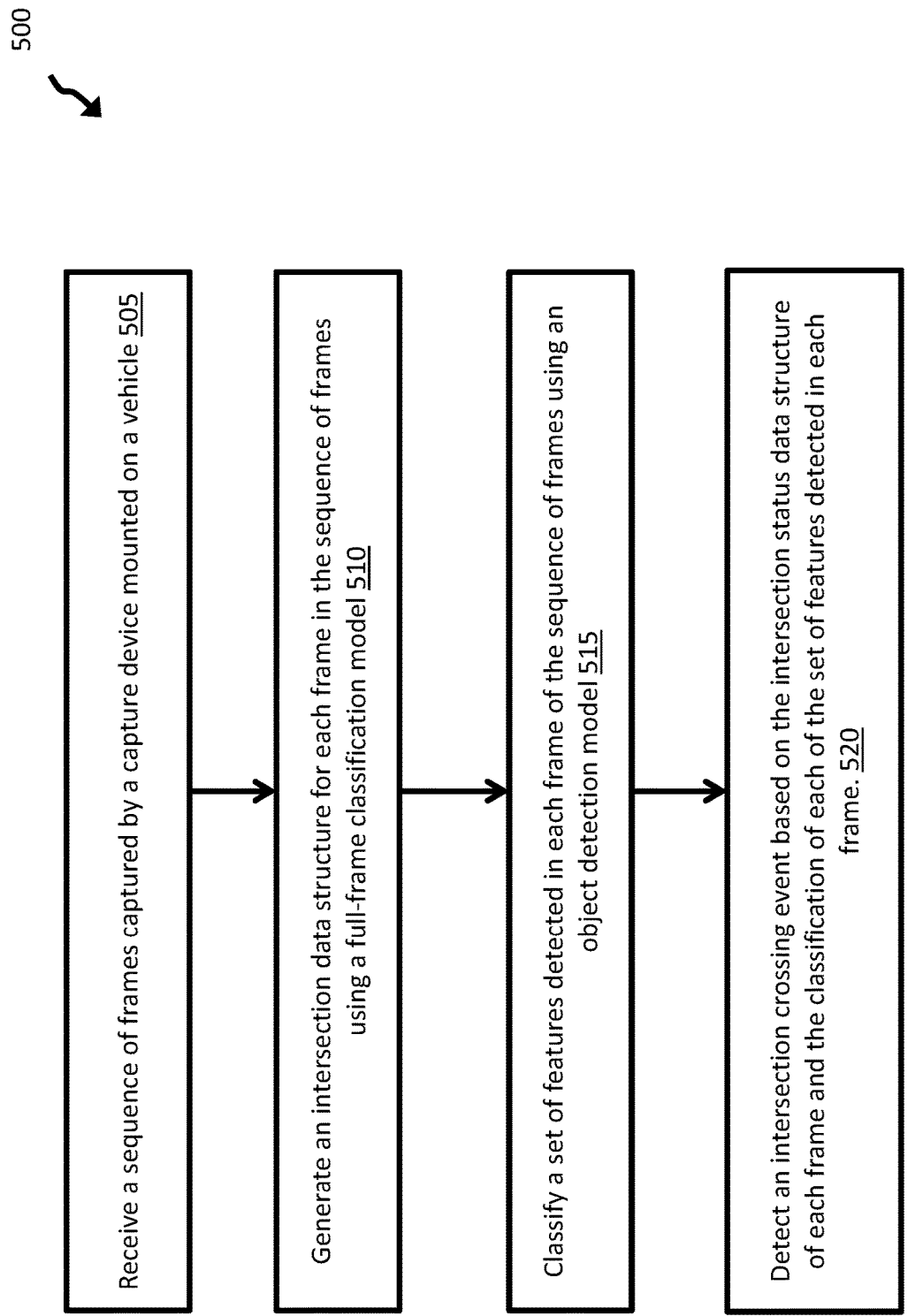

SYSTEMS AND METHODS FOR DETECTING INTERSECTION CROSSING EVENTS USING FULL FRAME CLASSIFICATION TECHNIQUES

CROSS-REFERENCE TO RELATED APPLICATION

This application is a U.S. National Phase Application under 35 U.S.C. § 371 of International Patent Application No. PCT/US22/32630, filed on Jun. 8, 2022, which claims the benefit of and priority to U.S. Provisional Patent Application No. 63/208,868, filed on Jun. 9, 2021, the contents of which are incorporated herein by reference in their entireties.

TECHNICAL FIELD

This application relates generally to using computer vision techniques to detect and classify intersection crossings by a vehicle.

BACKGROUND

Determining the timing and conditions of intersection crossings is important for evaluating driver performance and for ensuring proper compliance with driving regulations by autonomous vehicle navigation systems. Existing approaches to detecting intersection crossing events may rely on conventional object detection and tracking technology that is specific to certain intersection features, such as traffic lights or stop signs. However, systems that solely implement object detection and tracking techniques may suffer from false positives and may fail to detect conditions of an intersection that are relevant to the vehicle being monitored.

SUMMARY

Existing systems implement object detection models that are trained, for example, to detect and classify traffic lights in a two-stage process. First, a frame is captured that depicts an environment in front of a vehicle, and a bounding box detection algorithm is used to determine bounding boxes around detected objects in the frame that are likely to represent traffic lights. Then, a classification model is used to classify the presence and state of the traffic light in each bounding box. This approach is referred to as traffic-light object classification (TLOC).

TLOC-based approaches may suffer from certain limitations. For example, TLOC utilizes separate detection and classification models, and therefore the overall error of the TLOC system may be multiplicatively compounded by the inaccuracies of each model. In addition, bounding boxes that are detected inaccurately may not provide enough information for the classification model to properly classify the presence or type of traffic light in the bounding box, potentially leading to false-negative detection errors. For real-time driving systems, such as autonomous navigation systems, false-negative detection errors regarding traffic lights can lead to catastrophic consequences.

In addition, bounding box classifiers, sometimes referred to as "crop" classifiers, may be unable to distinguish which traffic light in a frame should be used to detect an intersection crossing when multiple traffic lights are detected. For example, crop-based classifiers may be unable to distinguish which traffic light is designated for which lane (e.g., a light for traffic moving straight through the intersection, a light for traffic making a left or right turn, etc.). Because TLOC approaches infer the presence of a traffic intersection from individual objects or features that may be detected within a camera view, heuristics that are based on the presence of objects detected in a frame may, due to false-positive detection errors, incorrectly "detect" an intersection crossing when no actual intersection crossing occurred.

Therefore, there is a need for a system that may more accurately detect and classify intersection crossings in their entirety by considering the features in an entire frame (or a substantial portion of the camera view) rather than solely those portions of the frame that correspond to traffic lights. The systems described herein improve upon conventional TLOC approaches by implementing a traffic light full-frame classification model (TLFFC), which is capable of classifying intersection conditions and crossing events while overcoming the inaccuracies of TLOC approaches. By utilizing a TLFFC model in conjunction with TLOC object detection and tracking techniques, the systems described herein can both detect and classify intersection crossing events with improved accuracy in a variety of environmental conditions.

At least one aspect of the present disclosure is directed to a method for classifying traffic indicators to detect intersection crossings by a vehicle. The method can be performed, for example, by one or more processors coupled to memory. The method can include receiving a sequence of frames captured by a capture device mounted to the vehicle. The method can include generating, using a full-frame classification model trained on a labeled dataset of frames depicting roadways, an intersection status data structure for each frame in the sequence of frames. The method can include classifying, using an object detection model, a set of features detected in each frame of the sequence of frames. The method can include detecting an intersection crossing event based on the intersection status data structure of each frame and the classification of each of the set of features detected in each frame.

In some implementations, the full-frame classification model can include at least five outputs. In some implementations, generating the intersection status data structure for each frame further can include generating the intersection status data structure to include at least five output values for each frame by providing each frame as input to the full-frame classification model. In some implementations, the at least five outputs comprise an intersection type output, a crossing type output, a left-turn light output, a right-turn light output, and a forward light output. In some implementations, the method can include transmitting a warning signal to an alert device responsive to detecting the intersection crossing event. In some implementations, the method can include determining, based on the intersection status data structure, that the intersection crossing event is a false positive. In some implementations, the method can include suppressing a warning signal responsive to determining that the intersection crossing event is a false positive.

In some implementations, determining that the intersection crossing event is a false positive can include determining that the set of features detected using the object detection model correspond to an underpass. In some implementations, detecting the intersection crossing event is further based on data captured by positioning sensors, such as a global-positioning system (GPS) receiver, and/or inertial sensors. In some implementations, detecting the intersection crossing event can include detecting a potential intersection crossing event based on the classification of each of the set of features detected in each frame. In some implementations, detecting the intersection crossing event can include validating the potential intersection crossing event using the intersection status data structure.

In some implementations, the sequence of frames comprises at least three frames. In some implementations, detecting the potential intersection crossing event can include determining the classification of each of the set of features detected in the at least three frames remains constant. In some implementations, classifying the set of features detected in each frame of the sequence of frames can include detecting one or more bounding regions that each correspond to a respective feature in each frame. In some implementations, classifying the set of features detected in each frame of the sequence of frames can include classifying the set of features by providing the one or more bounding regions of each frame as input to the object detection model.

At least one other aspect of the present disclosure is directed to a system for classifying traffic indicators to detect driving violations by a vehicle. The system can include one or more processors coupled to a non-transitory memory. The system can receive a sequence of frames captured by a capture device mounted to the vehicle. The system can detect, using an object detection model, a potential intersection crossing event based on a set of features detected in each frame of the sequence of frames. The system can generate, using a full-frame classification model trained on a labeled dataset of frames depicting roadways, an intersection status data structure for each frame in the sequence of frames. The system can validate the potential intersection crossing event based on the intersection status data structure generated using the full-frame classification model.

In some implementations, the system can detect the potential intersection crossing event by classifying a feature of the set of features detected in the sequence of frames as a traffic light. In some implementations, the system can detect the potential intersection crossing event by determining that the vehicle has passed the feature detected in the sequence of frames. In some implementations, the system can detect the potential intersection crossing event by detecting the potential intersection crossing event responsive to determining that the vehicle has passed the feature classified as the traffic light.

In some implementations, the system can generate the intersection status data structure to include an indication that the vehicle is approaching an intersection or in the intersection when the traffic light is red. In some implementations, the system can determine a severity of the potential intersection crossing event based on the indication that the vehicle is approaching an intersection or in the intersection when the traffic light is red. In some implementations, the system can transmit a warning signal to an alert device responsive to validating the potential intersection crossing event. In some implementations, the system can determine, based on a second intersection status data structure generated by the full-frame classification model using a second sequence of frames, that a second potential intersection crossing event is a false positive.

In some implementations, the system can determine that the potential intersection crossing event is a false positive by determining, based on the second intersection status data structure, that the second potential intersection crossing event corresponds to at least one of an underpass, a toll booth, a warning signal, or a railroad crossing. In some implementations, the system can detect the potential intersection crossing event based on data captured by a global-positioning system receiver. In some implementations, the system can detect the potential intersection crossing event based on a classification of each of the set of features across each frame in the sequence of frames and a finite-state machine. In some implementations, the sequence of frames can include at least three frames. In some implementations, the system can detect the potential intersection crossing event based on a transition matrix of the finite-state machine.

At least one other aspect of the present disclosure is directed to a method for classifying road images captured by a capture device mounted to a vehicle. The method can be performed, for example, by one or more processors coupled to memory. The method can include receiving a sequence of frames captured by the capture device mounted to the vehicle. The method can include generating, using a full-frame classification model having a plurality of heads trained on a labeled dataset of frames depicting roadways, a plurality of output probability values for each frame in the sequence of frames. Each of the plurality of output probability values can indicate a probability that each frame corresponds to a respective output class for each possible output class defined within a head, and for each of the plurality of heads. The method can include detecting, for example, that an intersection crossing event has occurred based on the probability that of an "approaching intersection" output value is high for a first frame, the probability of an "in intersection" output value is high for a second frame, and the probability of a "not in intersection" output value is high for a third frame, where each of these output values may be associated with a single output head that is concerned with the vehicle's position relative to an intersection.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure. For purposes of clarity, not every component may be labeled in every drawing. In the drawings:

FIG. 5 illustrates a flow of a method executed in a system for classifying traffic indicators to detect intersection crossings by a vehicle, according to an embodiment.

DETAILED DESCRIPTION

Figure 1A:
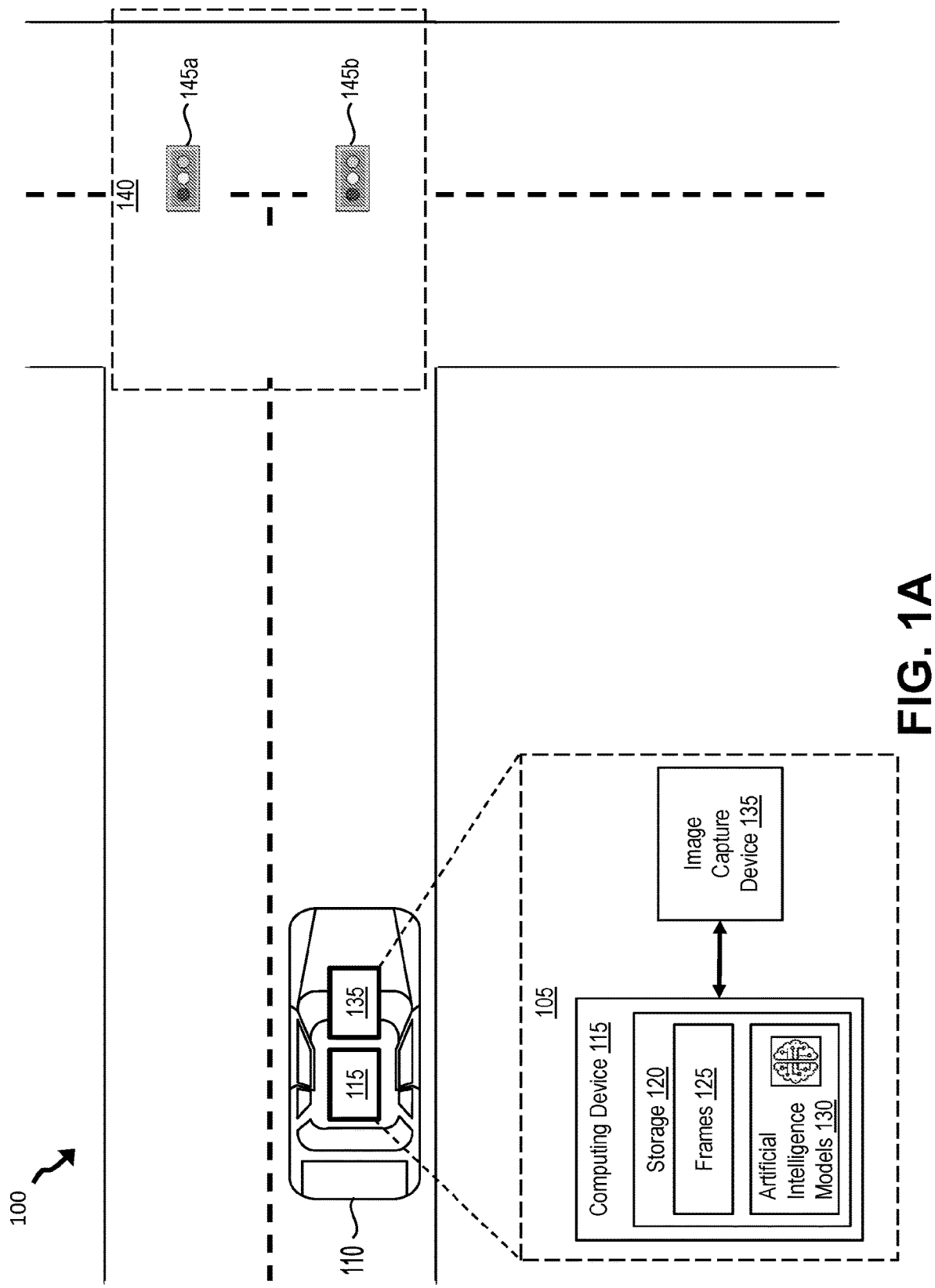
FIG. 1A illustrates components of a system for classifying traffic indicators to detect intersection crossings by a vehicle, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Determining the timing and conditions of intersection crossings is important for evaluating driver performance and for ensuring proper compliance with driving regulations by autonomous vehicle navigation systems. However, existing traffic light detection systems may have subpar accuracy and may not robustly detect which light, if multiple lights are detected, should be considered when determining whether an intersection crossing violation has occurred. The systems and methods described solve these and other issues by implementing a TLFFC model, which is capable of analyzing and classifying entire frames. Instead of, or in addition to, relying on multiple models to detect relevant objects and classify those objects, a TLFFC model provides a single model, or architecture, that performs both tasks at the same time.

A TLFFC model can be used to determine whether a traffic light is present in a frame captured by a capture device mounted on a vehicle, and classify the frame into one of many predetermined classes. The TLFFC model is trained to provide predictions for each of the possible directions of travel, including left turn lights, lights for forward movement through an intersection, and right-turn lights. In addition, the TLFFC model can be used to detect whether the vehicle is far away from, approaching, or within a traffic light intersection. If no traffic lights are present in the frame, then the TLFFC can properly detect that no intersection is present. The output of the TLFFC can be directly used to generate warnings and alerts for a driver of the vehicle, and to record the driver's performance with respect to intersection crossing events.

By using a TLFFC model to classify intersections represented in sequences of frames, the systems and methods described herein overcome the disadvantages of conventional TLOC approaches. Because the TLFFC is a single classification model, only a single error function needs to be optimized during training. Because the TLFFC model is a "full frame" classifier, it can identify spatial areas of interest in a frame, and can use key points from the frame to classify an intersection, if present. Therefore, a TLFFC model may be more efficient in accurately determining the correct light condition for crossing an intersection in whichever direction possible. The TLFFC model may determine the presence of a traffic intersection by detecting an intersection line in a frame. Based on the presence of the intersection line in the frame, the distance between the vehicle and the intersection can be determined. TLFFC-based approaches may outperform heuristic-based approaches for intersection detection used in TLOC-based techniques.

In some circumstances, however, TLFFC may present some disadvantages, and may not outperform a TLOC-based approach. For example, in conditions with high amounts of light, object detection may perform better than a solely TLFFC-based approach. In contrast, at night or in other low-light conditions, a TLFFC-based approach may provide better classification due to its "full frame" design. Therefore, certain embodiments of the systems and methods described herein may utilize a combination of a TLFFC-based approach and TLOC-based object detection techniques to overcome potential disadvantages of each individual approach. The combination of these two approaches is implemented as described herein using what is referred to as "traffic light fusion logic." This approach analyzes alerts generated based on both TLOC object detection and TLFFC outputs, and can confirm, reject or modify each TLOC alert based on the TLFFC output. If the TLFFC output does not indicate an intersection crossing event for a particular TLOC alert, then the TLOC alert can be rejected or suppressed, because the TLOC alert is not generated from a valid traffic light intersection. Accordingly, these systems and methods provide improvements to intersection detection technology.

A computing device can perform image analysis techniques in a real-time driving environment, including the intersection detection techniques described herein. In a non-limiting example, the computing device can receive a sequence of frames captured by a capture device mounted to a vehicle that is driving. The computing device can then perform the image analysis techniques described herein to classify traffic indicators and detect intersection crossing events by the vehicle. FIG. 1A depicts an example environment that includes example components of a system in which a computing device can classify traffic indicators and detect intersection crossing events. Various other system architectures that may include more or fewer features may utilize the methods described herein to achieve the results and outputs described herein. Therefore, the system depicted in FIG. 1A is a non-limiting example.

FIG. 1A illustrates a system 100, which includes components of an intersection detection system 105 for classifying traffic indicators to detect intersection crossings by a vehicle 110. The system 100 can include the vehicle 110, an intersection detection system 105, and an intersection 140, which here includes two traffic lights 145a and 145b (sometimes generally referred to as traffic light(s) 145). The intersection detection system 105 can include a computing device 115 and an image capture device 135. In some implementations, the intersection detection system 105 can include an alert device, such as an alarm or warning light. The computing device 115 can include a computer storage 120, which can store one or more frames 125 received from the image capture device 135 and one or more artificial intelligence models 130, which can include one or more TLOC models or TLFFC models used by the computing device 115 to detect intersection crossing events, as described herein. The system 100 is not confined to the components described herein and may include additional or other components, not shown for brevity, which are to be considered within the scope of the embodiments described herein.

The vehicle 110 can be any type of vehicle, such as a car, truck, sport-utility-vehicle (SUV), motorcycle, semi-tractor trailer, or other vehicle that can be driven on a road or another environment that includes one or more intersections 140 that include traffic lights 145 or other detectable traffic indicators. The vehicle 110 can be operated by a user, or in some implementations, can include an autonomous vehicle control system (not pictured) can that navigate the vehicle 110 or provide navigation assistance to an operator of the vehicle 110. As the vehicle 110 operates, the vehicle 110 may encounter intersections, such as the pictured intersection 140.

Although the intersection 140 is depicted here as a "T"-type intersection with two traffic lights 145, it should be understood that the vehicle 110 may encounter a variety of different types of intersections 140. Some non-limiting examples of intersection types include four-way intersections. T-junction intersections, Y-intersections, traffic circles, intersections with designated turning lanes. Likewise, an intersection 140 can include a variety of traffic lights 145 or other traffic features. For example, in an intersection 140 having multiple turning lanes, multiple traffic lights 145 may be present for each lane or each possible turning action. In some cases, an intersection 140 may not include any traffic lights 145, and instead may include one or more stop signs, yield signs, or other traffic indicators.

The traffic lights 145 can transition between multiple states to direct traffic in the intersection. In a non-limiting example, a traffic light 145 can transition to a red light state (e.g., a red circle, a red right arrow, a red left arrow, a flashing red circle, etc.), a yellow light state (e.g., a yellow circle, a yellow right arrow, a yellow left arrow, a flashing yellow circle, etc.), a green light state (e.g., a green circle, a green right arrow, a green left arrow, a flashing green circle, etc.), or other states. In addition, the vehicle 110, during normal operation, may encounter a variety of other types of road features, including overpasses, underpasses, railroad crossings, and pedestrian crossings, among others.

The vehicle 110 can include an intersection detection system 105, which can be used to detect intersection crossing events by the vehicle using the artificial intelligence models 130 described herein. As outlined above, the intersection detection system 105 can include a computing device 115. The computing device 115 can include at least one processor and a memory, (e.g., a processing circuit, etc.). The memory (e.g., the storage 120, other computer memory, etc.) can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof.

The memory may include, but is not limited to, electronic, optical, magnetic, or any other storage or transmission device capable of providing the processor with program instructions. The instructions may include code from any suitable computer programming language. The computing device 115 can include any or all of the components and perform any or all of the functions of the computer system 150 described in conjunction with FIGS. 1B-1C.

The computing device 115 can include a storage 120, which can store one or more frames 125 received from the image capture device 135, and one or more artificial intelligence models 130 which can include one or more TLOC models and a TLFFC model, as described herein. The storage 120 can be a computer-readable memory that can store or maintain any of the information described herein that is generated, accessed, received, transmitted, or otherwise processed by the computing device 115. The storage 120 can maintain one or more data structures, which may contain, index, or otherwise store each of the values, pluralities, sets, variables, vectors, numbers, or thresholds described herein. The storage 120 can be accessed using one or more memory addresses, index values, or identifiers of any item, structure, or region of memory maintained by the storage 120.

In some implementations, the storage 120 can be internal to the computing device 115. In some implementations, the storage 120 can exist external to the computing device 115, and may be accessed via one or more communications interfaces (e.g., such as those described in connection with FIGS. 1B and 1C, etc.). In some implementations, the storage 120 can be distributed across many different storage elements, and may be accessed via a suitable computer bus interface. The computing device 115 (or any components thereof) can store, in one or more regions of the memory of the storage 120, the results of any or all computations, determinations, selections, identifications, generations, constructions, or calculations in one or more data structures indexed or identified with appropriate values. The storage 120 can include or perform any of the features or functionalities of the storage 128 described in connection with FIG. 1B.

In addition, the computing device 115 can include one or more communications interfaces that can communicate wirelessly with other devices. The communications interfaces of the computing device 115 can include, for example, a Bluetooth communications device, or a 5G/LTE cellular data communications device. The communications interfaces can be used, for example, to transmit any information related to detected intersection crossing events to an external server. Such information can include, for example, one or more frames 125 depicting the intersection crossing event, vehicle 110 speed information, a timestamp corresponding to the intersection crossing event, or any other information related to the intersection crossing event.

In some implementations, the one or more communications interfaces can be used to communicate with other computing devices, such as those that can configure the computing device 115. The computing device 115 can include or in be in communication with one or more sensors, including a global-positioning system (GPS) receiver, an accelerometer sensor, a gyroscope, a magnetometer, or any other type of inertial sensor. Using signals captured by the GPS receiver and/or motion sensors, the computing device 115 can estimate the speed of the vehicle 110. For example, by periodically taking GPS measurements, and measuring the difference between two position measurements over time, the computing device 115 can estimate an average velocity of the vehicle 110. The GPS measurements can also be used by the computing device 115 to estimate a direction of the vehicle 110, for example, when determining the direction a vehicle has traveled through an intersection (e.g., left turn, straight, right turn, etc.).

The intersection detection system 105 can include an image capture device 135, which can be, for example, any sort of camera capable of capturing one or more frames 125.

In some implementations, the image capture device 135 is a video camera capable of producing a video stream. The frames 125 can be, for example, an image that is associated with a particular timestamp in the video stream. In some implementations, the image capture device 135 captures the frames at predetermined intervals, and stores the frames 125 individually and not part of a video stream. The image capture device 135 can be mounted on the vehicle 110 that includes the intersection detection system 105. For example, the image capture device 135 can be positioned on or near the windshield of the vehicle such that the image capture device 135 captures images (e.g., the frames 125, etc.) of the environment in front of the vehicle. For example, when the vehicle 110 is operating, the image capture device 135 can capture frames 125 that depict the roadway in front of the vehicle, which may include an intersection 140 and one or more traffic lights 145 or other traffic or road features. In some implementations, the image capture device 135 may be integrated into the vehicle (e.g., into a front bumper) or may be an aftermarket component (e.g., affixed to a windshield or dashboard).

The frames 125 captured by the image capture device 135 can include one or more pixels, and can be communicated to the computing device 115 via one or more communications interfaces. For example, in some implementations, the computing device 115 can request or retrieve the frames 125 from the image capture device 135, which can then transmit the frames 125 to the computing device 115 for processing and storage. The frames 125 can be any sort of image file, or can form a part of an image stream of any suitable codec or format. Each frame 125, when captured, can be associated with a timestamp identifying the time at which the frame 125 was captured.

Each frame 125 can include pixels arranged in a grid that makes up the frame 125, where each pixel includes color data and location data that identifies the color and location of the pixel in the frame 125. In some implementations, the image capture device 135 can capture the frames 125 in one or more different color channels (e.g., each channel corresponding to a particular color wavelength). In some implementations, the image capture device 135 can be a camera or video capture device that captures non-visible light (e.g., infrared light, etc.). Each color channel in a pixel of a frame 125 can identify the intensity of a particular color of the pixel. These color intensity values (e.g., the color of each pixel in a frame 125, etc.) can be provided as input to the artificial intelligence models 130, as described herein.

The computing device 115 can perform TLOC-based object detection techniques, and TLFFC based full-frame classification, to detect intersection crossing events that involve the vehicle 110. For example, using the output of the TLFFC, or using the output of the TLFFC in combination with the output of a TLOC-based approach, the computing device 115 can determine whether the vehicle has crossed an intersection 140, and the status of the intersection 140 when it was crossed (e.g., red light, green light, etc.). Such intersection detection techniques are described in further detail herein in connection with FIGS. 2-5. It should be understood that the computing device 115 can use TLOC-based techniques and TLFCC based techniques in any combination to achieve desired results. In some implementations, the computing device 115 can rely solely on a TLFFC model (which can be part of the artificial intelligence models 130, as described herein) to perform intersection crossing detection.

The computing device 115 can use the artificial intelligence models 130 to both detect and classify an intersection 140 in one or more of the frames 125. Then, the computing device 115 can use the output of the artificial intelligence models 130 to determine whether the vehicle 110 has crossed a detected intersection 140. The artificial intelligence models 130 can include a variety of machine learning models, including object detection models that regress bounding boxes around features of interest detected in a frame 125, object classification models that can classify features in regressed bounding boxes, and full-frame classification models, including the TLFFC model as described in greater detail herein in connection with FIGS. 2 and 3.

The artificial intelligence models 130 can include machine-learning models for object detection, including bounding box detection. Such object detection models can be used by the computing device 115 in TLOC-based approaches to detect traffic lights 145 in frames 125 that depict intersections 140. As described herein, the TLOC-based approach to intersection detection can utilize two machine-learning models: one model to detect objects of interest (e.g., traffic lights 145, other relevant intersection features, etc.) in the frames 125, for example, by regressing bounding boxes around the features of interest, and a classification model that classifies the objects represented in each detected bounding box. The object detection model can be a machine-learning model, such as a deep-neural network (DNN), which is trained to detect the presence and location of one or more objects, such as traffic lights 145, in a frame 125.

The object detection model can be trained, for example, on sets of training data, which includes labeled (e.g., with coordinates of regressed bounding boxes, etc.) images depicting features of interest, such as traffic lights 145. The object detection model can be trained using back-propagation techniques, such that the weights, biases, and other trainable parameters are trained iteratively to regress bounding boxes around features of interest. In a TLOC-based approach, the object detection model can be trained to regress bounding boxes around traffic lights 145 in a frame 125. The computing device 115 can use a frame 125 as input to the object detection model. The object detection model can include a number of layers, such as fully connected layers, convolutional layers, or other types of neural network layers.

The computing device 115 can propagate the input frame 125 through the object detection model to identify coordinates of a bounding box or bounding region surrounding each detected object in the input frame 125. Then, using the coordinates of the bounding boxes, the computing device 115 can extract a region of the frame 125 that falls within the bounding box. For example, the computing device 115 can extract each of the pixels that fall within a bounding box and store their color values in one or more data structures. The computing device 115 can extract each region detected as corresponding to a feature of interest (e.g., a traffic light 145) from the frame 125, which can be used as input to a classification model to classify the type or status of the extracted feature.

The artificial intelligence models 130 can include an object classifier model, which can be used as part of a TLOC-based approach to detect an intersection crossing event. An object classifier model can be, for example, a convolutional neural network (CNN) that accepts the extracted bounding regions of the frame 125 output by the object detection model, and classifies the feature in the extracted bounding region. For example, the object detection model can output a region of the frame 125 that likely corresponds to a traffic light 145, and the object classification model can be used to determine the presence and status of the traffic light 145 (e.g., green light, red light, etc.).

The object classification model can be trained using labeled training data, which includes images of traffic lights 145 or other traffic features and corresponding labels indicating the status of the traffic light 145 in the training image. The object classification model can be trained using back-propagation techniques, such that the weights, biases, and other trainable parameters of the model are trained iteratively to classify the presence and status of a traffic light 145 in an image or region of frame 125. The object classification model can include one output head or output layer. In some implementations, the output layer of the object classification model can be a softmax layer, which can output a vector of probability values that each correspond to a respective status of the traffic light 145 or other traffic feature. Each status of the traffic light 145 or traffic feature can be encoded by position in the output vector.

The artificial intelligence models 130 can further or alternatively include a TLFFC model. The TLFFC model is a full frame classifier, and can therefore accept an entire frame 125 as input and provide a number of classifier output values. In one implementation, the TLFFC model can include five output heads, each head leading to an output layer. Further details of an example structure of the TLFFC model are described in connection with FIG. 3. The output heads of the TLFFC model can include, for example, an output head corresponding to an intersection type, an output head corresponding to a crossing type, an output head corresponding to the status of a light for a left turn, an output head corresponding to the status of a light for a right turn, and an output head corresponding to the status of a light for going straight through the intersection. Further details of the outputs of the TLFFC model are described in connection with FIG. 3. The outputs of the TLFFC model that are generated from an input frame 125 can be stored in an intersection status data structure, which includes each of the five output values (or sets of values) generated by the TLFFC model. Although the TLFFC model is described as including the aforementioned output heads, it should be understood that this configuration of the TLFFC model is provided for example purposes. The TLFFC model can include more or fewer output heads that provide output values to various characteristics of an input frame 125.

The TLFFC model can be convolution neural network that is trained on sets of training data that depict intersections 140. An item of the training data can be, for example, an image of an intersection that includes traffic lights 145 or any other type of roadway. Each item of the training data may be labeled for all of the output heads of the TLFFC model, so that the outputs of the TLFFC model may be trained together to maintain an inter-head relationship. In addition, the training data may be labeled to indicate whether the vehicle 110 is approaching the intersection 140 or within the intersection. For some images of the training data, this label value may be based on the presence of an intersection line near the bottom of the image in the training data. If the intersection 140 is depicted in the image as close to the vehicle 110, and the intersection line is present near the bottom of the image, the image can be labeled as "approaching intersection." Likewise, if the intersection is depicted in the image as close to the vehicle 110, and the intersection line is not present near the bottom of the image, the image can be labeled as "in the intersection."

To prepare a training data set for a TLFFC model, a human reviewer may be instructed to judge a sequence of images to determine in each frame whether the driver is (1) approaching an intersection, (2) in the intersection, or (3) not near an intersection. The distinction between (1) and (2) may usually be based on whether an intersection line (usually a perpendicular line, such as a stop line or a portion of a crosswalk like) is present and visible at that particular intersection. If it is present, then if it is also visible in an image of the sequence, the corresponding image should be annotated as "1." When the intersection line is no longer present in the sequence, then the corresponding images for which the intersection line is not present should be annotated as "2." If, however, there is no intersection line present at that intersection, the labeler should make a judgment based on other features. For example, the labeler may consider an imaginary line extending from the curb of a cross-street. He or she might also consider where lane boundaries terminate. In some cases, if no reliable cues are present, the labeler might try instead to estimate a distance of 100 ft from the location of the traffic light. The neural network is then trained with these labels, and then in operation the neural network head that is concerned with the vehicle's position relative to an intersection can make accurate determinations of "approaching" vs. "in" the intersection. The presence of a perpendicular intersection line may be a strong signal for the neural network, but for a neural network trained in this way, the presence of an intersection line is not required. Based on a training protocol that includes examples that do or do not have a perpendicular intersection line, the neural network will likely make use of other features that are present in the scene to make this determination. Additional labels are applied to the image based on the presence and status of left-turn lights, right-turn lights, and straight lights, as well as the type of intersection 140 or crossing depicted in the image.

The TLFFC model can be trained by applying the images in the training data iteratively, and comparing the output of each of the heads of the model with the labels associated with the input training data. The difference between the labels and the outputs of the model is error for that item of training data, which can be back-propagated through each layer of the TLFFC model using a backpropagation algorithm to update the weights, biases, and other trainable parameters of the model. In this way, all of the output heads of the model can be trained together on a common set of the training data. Using a single model to classify the status and presence of the intersection 140 overcomes certain accuracy issues present in approaches that rely solely on TLOC-based techniques.

As explained above, using only a TLFFC model to detect intersection crossing events may suffer from diminished accuracy in certain other circumstances, such as high-light environments. To overcome these issues, the computing device 115 may implement logic that combines the outputs of the TLFFC model with the outputs of the TLOC models to improve overall system accuracy with respect to intersection crossing event detection. This logic can be referred to herein as the traffic light fusion logic, which is described in detail in connection with FIG. 2. When using the traffic light fusion logic, the computing device 115 can execute both the TLOC-based approach and the TLFFC model (which may occur in parallel) on the same sequence of input frames 125. When outputs for each of the models are generated, the computing device 115 can apply a set of logical rules to detect the occurrence of the intersection crossing event across a sequence of frames 125. For example, if the TLOC-based approach indicates that a crossing has occurred, but the TLFFC model has classified the sequence of frames as "no intersection," the computing device 115 can suppress the warning generated by the TLOC-based approach. The combined use of the two models can overcome a number of error modes and may substantially improve the accuracy and robustness of driving event detection and classification.

Likewise, in low-light environments, the traffic light logic of the computing device 115 may utilize solely the output of the TLFFC model instead of the TLOC-based approach, because the TLFFC model has relatively higher accuracy in low-light environments. In addition, the TLFFC model can be used to check for various conditions that may be mistaken for an intersection 140, including underpasses, railroad crossings, and stop-sign intersections. If the TLOC-based approach generates a warning signal in any of these circumstances, such as in an Advanced Driver Assist System embodiment, the output of the TLFFC model may be used to suppress the warning, because the intersection 140 is not a valid intersection 140 for crossing detection. If both the TLOC-based approach and the TLFFC model both output an indication that an intersection crossing has occurred, the computing device 115 can detect the intersection crossing and generate an intersection crossing signal.

The intersection crossing signal is a digital signal that indicates the vehicle 110 has crossed through an intersection 140 improperly (e.g., ran a red light, etc.) or properly (e.g. crossed the traffic light when a green light indicated that the driver had the right-of-way). The computing device 115 can store the intersection crossing signal, for example, in association with copies of the sequence of frames 125 that depict the intersection crossing and a timestamp corresponding to the intersection crossing event. In some implementations, the intersection crossing signal can indicate information about the status of the vehicle 110 at the time of the intersection crossing event, including a vehicle speed, whether the vehicle 110 was braking, whether the vehicle 110 was making a turn, or a direction the vehicle 110 passed through the intersection 140 (e.g., from GPS data, etc.), among other vehicle status information. In some implementations, the computing device 115 can transmit the intersection crossing signal to an external computing device via a communications interface, such as via a WiFi signal, a 5G/LTE signal, a Bluetooth signal, a radio signal, or another type of wireless communication signal. In some implementations, the computing device 115 can transmit the intersection crossing signal to an alert device within the vehicle 110.

For example, an alert device can be included in the intersection detection system 105, and can be a device that alerts a driver of a pending or recently completed intersection crossing event in response to the intersection crossing signal. When receiving the intersection crossing signal, the alert device can output any type of warning signal that safely alerts the driver to the event, such as a flashing light or an auditory alarm, among others. In some implementations, the alert device can form a part of the computing device 115, or can form a part of an autonomous vehicle navigation system. In some implementations, the alert device can receive the intersection crossing signals from the computing device 115, and, in the case of a pending intersection crossing violation, cause an autonomous vehicle navigation system, if present, to perform a corrective action. If the intersection crossing violation was already completed, an alert system may still be usefully triggered as an immediate feedback signal that may be effective in shaping future driving behavior.

In some implementations, the vehicle 110 can include one or more sensors or computing devices that can provide signals to the computing device 115 via a communications interface, such as a control area network (CAN) bus or an on-board diagnostics interface. The communications interface of the vehicle 110 can provide signals that indicate, for example, whether the vehicle 110 is currently braking, whether the vehicle 110 is turning, whether the vehicle 110 has a turning indicator activated, or other vehicle conditions. In some implementations, the computing device 115 itself can receive status information about vehicle 110 via the communications interface, and store the status information with any detected intersection crossing events as described herein.

The methods described herein for classifying traffic indicators to detect driving violations and non-violation events by a vehicle 110 may be implemented using the computing environment described in connection with FIGS. 1B and 1C.

Figure 1B:
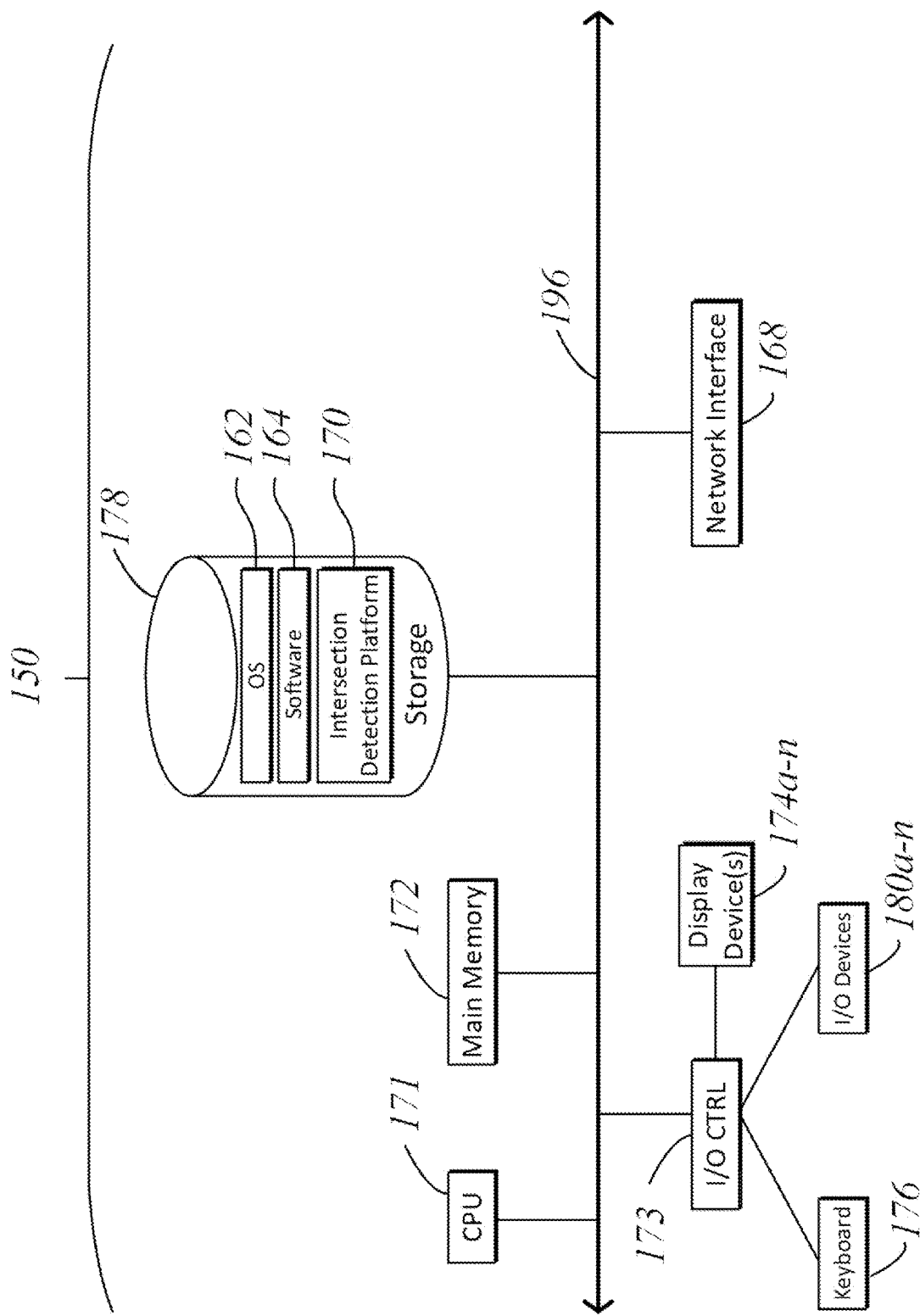
FIGS. 1B and 1C are block diagrams depicting computing devices useful in connection with the methods and systems described herein, according to an embodiment.

As shown in FIG. 1B, a computer system 150 may include a storage device 178, a network interface 168, an input/output (I/O) controller 173, display devices 174a-174n, as well as input devices, such as a camera 176. The camera 176 can include, for example, a single-lens reflex camera (SLR), a digital SLR (DSLR) camera, or any other type of image or video capture device. The storage device 178 may include, without limitation, an operating system (OS) 162, software 164, and an intersection detection platform 170, which can implement any of the features of the intersection detection system 105 described above in connection with FIG. 1A. As shown in FIG. 1C, each computer system 150 may also include additional optional elements, e.g., a memory port 182, a bridge 198, one or more I/O devices 180a-180n (generally referred to using reference numeral 180), and a cache memory 194 in communication with the central processing unit 171.

The central processing unit 171 is any logic circuitry that responds to and processes instructions fetched from the main memory unit 172. The central processing unit 171 may be provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The central processing unit 171 can include processing devices manufactured by Qualcomm of San Diego, California. The computer system 150 may be based on any of these processors, or any other processor capable of operating as described herein. The central processing unit 171 may utilize instruction level parallelism, thread level parallelism, different levels of cache, and multi-core processors. A multi-core processor may include two or more processing units on a single computing component.

Main memory unit 172 may include one or more memory chips capable of storing data and allowing any storage location to be directly accessed by the microprocessor 171. Main memory unit 172 may be volatile and faster than storage 178 memory. Main memory units 172 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 172 or the storage 178 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 172 may be based on any of the above described memory chips, or any other available memory chips capable of operating as described herein. In the embodiment shown in FIG. 1B, the processor 171 communicates with main memory 172 via a system bus 196. FIG. 1C depicts an embodiment of a computer system 150 in which the processor 171 communicates directly with main memory 172 via a memory port 182. For example, in FIG. 1C the main memory 172 may be DRDRAM.

Figure 1C:
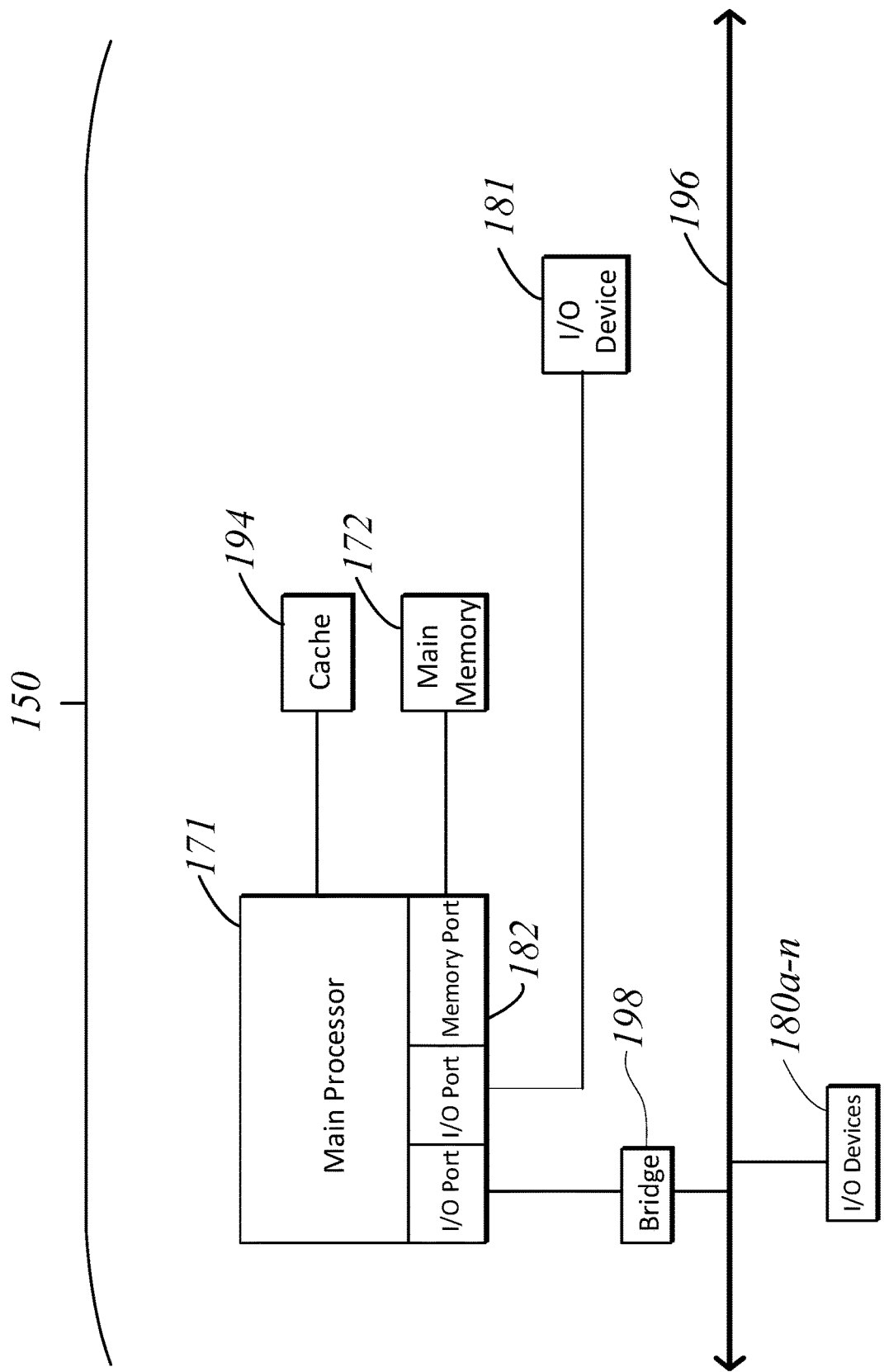

FIG. 1C depicts an embodiment in which the main processor 171 communicates directly with cache memory 194 via a secondary bus, sometimes referred to as a backside bus. In other embodiments, the main processor 171 communicates with cache memory 194 using the system bus 196. Cache memory 194 typically has a faster response time than main memory 172 and is typically provided by SRAM, BSRAM, or EDRAM. In the embodiment shown in FIG. 1C, the processor 171 communicates with various I/O devices 180 via a local system bus 196. Various buses may be used to connect the central processing unit 171 to any of the I/O devices 180, including a PCI bus, a PCI-X bus, or a PCI-Express bus, or a NuBus. For embodiments in which the I/O device 180 includes a video display 174, the processor 171 may use an Advanced Graphics Port (AGP), a high-definition multimedia interface (HMDI) interface, or a DisplayPort interface to communicate with the display 174 or the I/O controller 173 for the display 174. FIG. 1C depicts an embodiment of a computer system 150 in which the main processor 171 communicates directly with I/O device 180*b*. FIG. 1C also depicts an embodiment in which local buses 196 and direct communication are mixed: the processor 171 communicates with I/O device 180*a* using a local interconnect bus 196 while communicating with I/O device 180*b* directly.

A wide variety of I/O devices 180*a*-180*n* may be present in the computer system 150. I/O devices 180*a*-180*n* can include alarm devices, such as an alarm device capable of emitting an auditory signal that can alert a driver to an improper intersection crossing event. An example I/O device 180 can be an alarm device that also provides a visual indication when improper intersection crossing event is detected, such as a flashing light or another type of display device 174. In some cases, configuration of the computing devices described herein can be performed remotely, such as via the network 168, or by local input. In cases where local input is desired to configure the computer system 150, optional input devices 180 can be included. The optional input devices 180 can include keyboards, mice, trackpads, trackballs, or touchpads, among others. In addition, the input devices 180 can include optional sensors that can provide data that may be relevant for detecting intersection crossing events or monitoring conditions of the vehicle 110. Such sensors can include accelerometers, pressure sensors, magnetometer sensors, angular rate sensors, depth sensors, proximity sensors, ambient light sensors, gyroscopic sensors, or other sensors. Output devices 180 can include alarm devices, graphical displays, speakers, or other types of devices.

The I/O devices 180 may be controlled by an I/O controller 173 as shown in FIG. 1B. The I/O controller 173 may control one or more I/O devices 180, such as the camera 176, which can capture images or video of an environment, for example, in front of a vehicle 110 as described in connection with FIG. 1A. Furthermore, an I/O device 180 may also provide storage medium 178 for the computer system 150. In still other embodiments, the computer system 150 may provide USB connections (not shown) to receive handheld USB storage devices, for example, to configure the computer system 150 by providing updates to the operating system 162, the software 164, or the intersection detection platform 170. In further embodiments, an I/O device 180 may be a bridge between the system bus 196 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 174*a*-174*n* may be connected to I/O controller 173. Display devices 174 may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, or liquid crystal laser displays. In some embodiments, display devices 174*a*-174*n* or the corresponding I/O controllers 173 may be controlled through or have hardware support for OPENGL or DIRECTX API or other graphics libraries.

In some embodiments, the computer system 150 may include or connect to multiple display devices 174*a*-174*n*, which each may be of the same or different type and/or form. As such, any of the I/O devices 180*a*-180*n* and/or the I/O controller 173 may include any type and/or form of suitable hardware, software 164, or combination of hardware and software 164 to support, enable or provide for the connection and use of multiple display devices 174*a*-174*n* by the computer system 150. For example, the computer system 150 may include any type and/or form of video adapter, video card, driver, and/or library to interface, communicate, connect or otherwise use the display devices 174*a*-174*n*. In some implementations, video cards, such as graphics processing units (GPUs), may also be used to perform one or more of the computational tasks set forth herein. In such cases, one or more GPUs may communicate with the main processor 151 via the system bus 196, and process computational workloads, such as the image processing techniques described herein, in parallel with operations performed by the main processor 151.

Referring again to FIG. 1B, the computer system 150 may comprise a storage device 178 (e.g. one or more hard disk drives or redundant arrays of independent disks) for storing an operating system 162 or other related software 164, and for storing application software programs 164 such as any program related to the intersection detection platform 170. The intersection detection platform 170 can include executable instructions or hardware, which implements any of the features of the intersection detection system 105 described herein below in connection with FIG. 1A. Examples of storage device 178 include, e.g., hard disk drive (HDD); optical drive including CD drive, DVD drive, or BLU-RAY drive; solid-state drive (SSD); USB flash drive; or any other device suitable for storing data. Some storage devices 178 may include multiple volatile and non-volatile memories 172, including, e.g., solid state hybrid drives that combine hard disks with solid state cache 194. The storage device 178 may be non-volatile, mutable, or read-only. The storage device 178 may be internal and connect to the computer system 150 via a bus 196. The storage device 178 may be external and connect to the computer system 150 via a I/O device 180 that provides an external bus. The storage device 178 may connect to the computer system 150 via the network interface 168 over a network.

In some implementations, the computer system 150 may include a network interface 168 to interface to a network through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax, and direct asynchronous connections). In one embodiment, the computer system 150 communicates with other computer systems (not pictured) via any type and/or form of gateway or tunneling protocol e.g. Secure Socket Layer (SSL) or Transport Layer Security (TLS). The network interface 168 may comprise a built-in network adapter, network interface card, PCMCIA network card, EXPRESSCARD network card, card bus network adapter, wireless network adapter, USB network adapter, modem, or any other device suitable for interfacing the computer system 150 to any type of network capable of communication and performing the operations described herein.

A computer system 150 of the sort depicted in FIG. 1C may operate under the control of an operating system 162, which controls scheduling of tasks and access to system resources. The computer system 150 can be any computing device 115 that can be integrated with or positioned in a vehicle, such as the vehicle 110. The computer system 150 has sufficient processor power and memory capacity to perform the operations described herein. In some implementations, the operations performed herein can be performed on a computing device 115 that is integrated with a vehicle 110, such as an autonomous driving control system that controls or manages other aspects of the operations of the vehicle 110.

Figure 2:
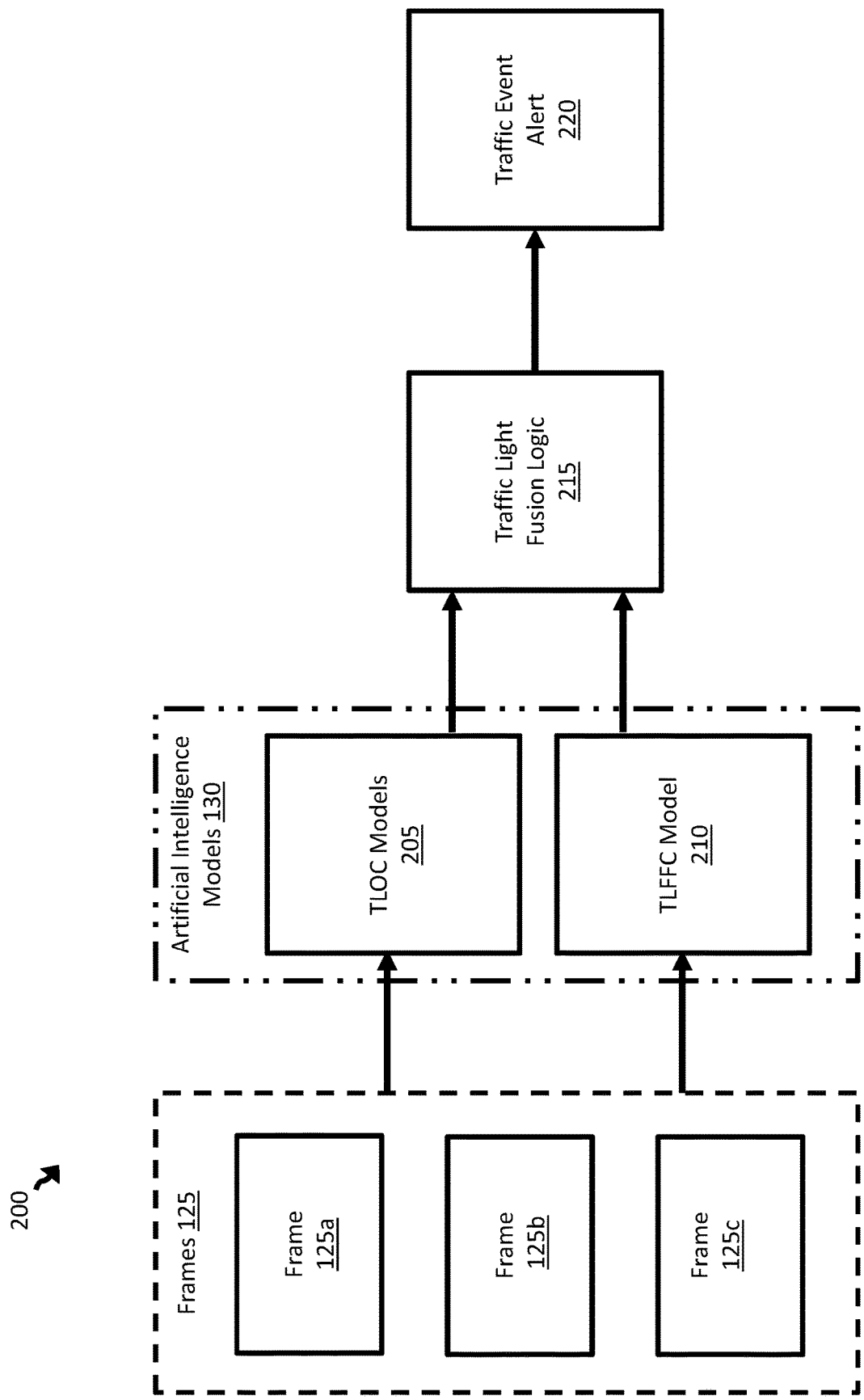
FIG. 2 illustrates a data flow diagram of traffic-event detection components implemented by the system depicted in FIG. 1A, according to an embodiment.

Referring now to FIG. 2, illustrated is a data flow diagram 200 of operations implemented by the intersection detection system 105 depicted in FIG. 1A to classify traffic indicators and detect intersection crossings events by a vehicle 110, according to an embodiment. The flow diagram includes a sequence of frames 125a-125c (sometimes referred to herein as the "sequence of frames 125" or the "frame(s) 125"), which are provided as input to the artificial intelligence models 130. The artificial intelligence models 130 may include TLOC models 205 and a TLFFC model 210. The outputs from the artificial intelligence models 130 can be provided as input to the traffic light fusion logic 215, which is capable of determining intersection crossing events based on conditions detected in each of the sequence of frames 125. The output of the traffic light fusion logic 215 is provided as the traffic event alerts 220, which can include indications of varying degrees of severity for traffic light crossing events. The operations depicted in the data flow diagram 200 is described as being executed by a computing device, such as the computing device 115 described in FIG. 1).

At the start of the data flow diagram 200, the computing device 115 can receive a sequence of frames 125 that are captured by a capture device (e.g., the capture device 135, etc.) mounted to a vehicle (e.g., the vehicle 110). The sequence of frames 125 can be any number of frames. In some implementations, the traffic light fusion logic 215 can utilize at least three frames to detect an intersection crossing event. However, it should be understood that different numbers of frames can be used. Each of the frames 125a-125c can be consecutive frames captured by the capture device 135. For example, the frames can be consecutive frames captured in a video stream. In some implementations, the frames 125a-125c can be consecutively captured images (e.g., images captured periodically at a predetermined time interval by the capture device 135). Although the frames 125a-125c are shown as captured in parallel, the entire sequence of frames need not necessarily be present to begin the data flow process 200. The computing device 115 can begin processing the frames as they are iteratively received from the capture device 135 by providing the frame as input to the artificial intelligence models 130 as soon as it is captured.

Once a frame of the sequence of frames 125 is captured and provided to the computing device, the computing device 115 can generate an intersection status data structure using the TLFFC model 210. The TLFFC model may be a convolution neural network model that can include at least five output heads, each head terminating in an output layer so that collectively the outputs of the model may be read from the output layers. The TLFFC model 210 can take, as input, a frame of the sequence of frames 125. Because the TLFFC model 210 is a feedforward neural network, the computing device 115 can generate an output classification at each of the output layers by propagating the input frame through each layer of the TLFFC model 210. The computing device 115 can use each of the outputs of the TLFFC model 210 to populate an intersection status data structure, which includes values that describe the characteristics of an intersection, if present, in the frame provided as input to the TLFFC model 210. The structure of the TLFFC model 210 is described herein in connection with FIG. 3.

Figure 3:
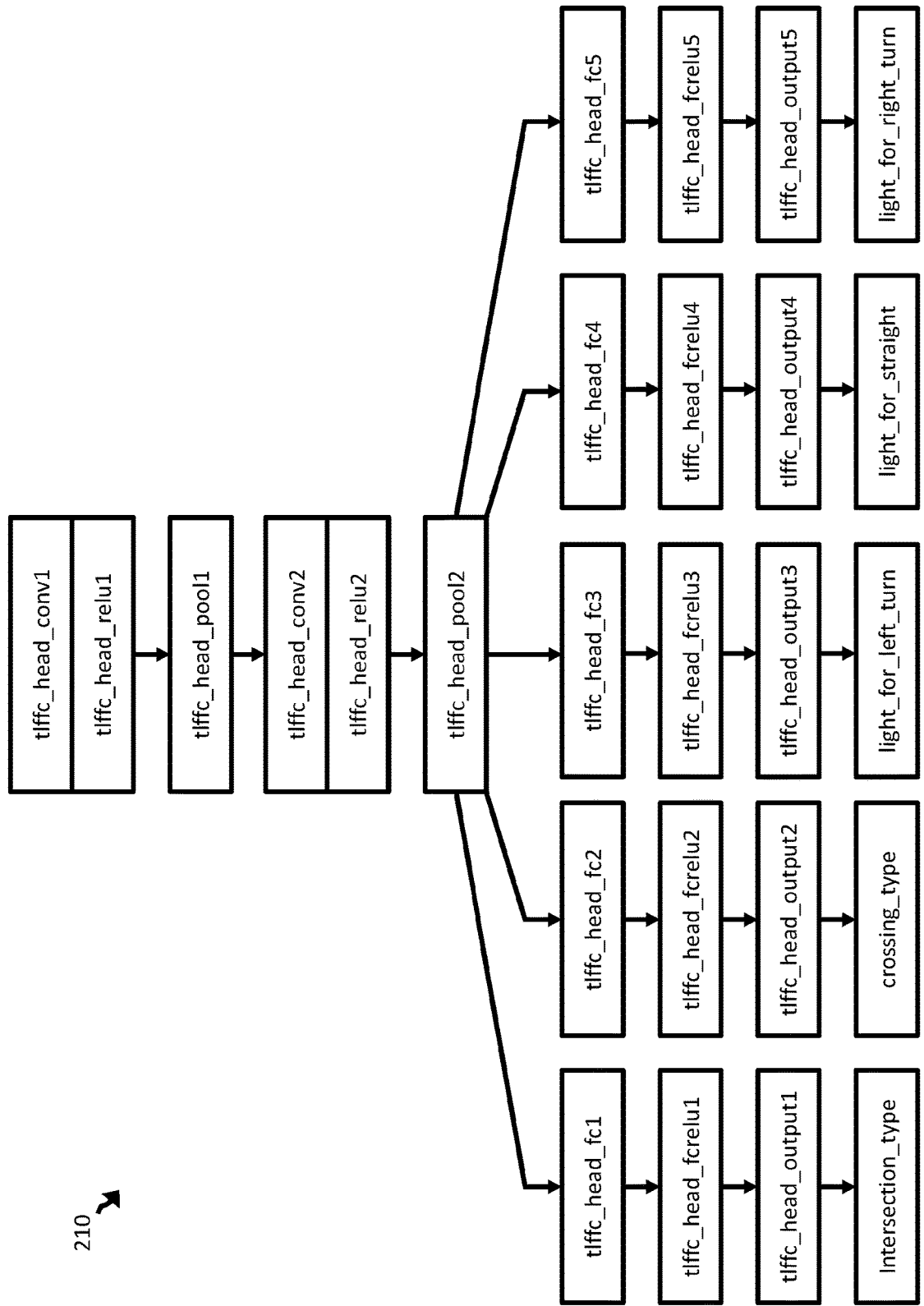
FIG. 3 is a block diagram depicting an example architecture of a TLFFC model, according to an embodiment.

Referring now to FIG. 3, depicted is a block diagram 300 of an example architecture of the TLFFC model 210, according to an embodiment. As shown, the TLFCC model 210 is a convolution neural network with multiple output heads. Each block in the diagram 300 represents a layer of the TLFFC model 210. The layers in the TLFFC model 210 having the suffix "conv" followed by an identifier number are convolution neural network layers. A convolutional neural network layer is generally used to reduce input data, such as a frame 125, into a more compact representation of the relevant features of the image. When propagating input data through a convolutional network layer, the computing device 115 passes a sliding window over each of the pixels or input data to the convolutional layer. In general, a pixel in an image is simply a collection of color channels that each represent an intensity of a respective color in the pixel (e.g., red, blue, green, etc.). A convolutional layer can include a filter for each of the color channels in the input frame. The filter is then iteratively (or in parallel on an appropriate computational substrate) passed over each position in the input frame to calculate an output value by performing a two-dimensional convolution on the pixel locations of the sliding window. The output value is then stored in a corresponding output data structure, which can be provided as input to the next layer in the TLFFC model 210.

The layers in the TLFFC model 210 having the suffix "relu" followed by an identifier number are rectified linear activation function (ReLU) layers. A ReLU layer is a piecewise function that provides the input value as the output if the input value is positive, and outputs zero if the input value is negative. In general, a ReLU function is applied to each coordinate of the data structure that is provided as input to the ReLU layer (e.g., each value output by a convolutional layer or a fully connected layer, etc.). Models that utilize ReLU activation function layers can have greater performance than models with other types of activation functions, particularly for image processing and classification functions. As shown, the first two layers of the TLFFC model 210 are a convolutional layer that provides its output to a first ReLU activation function, which is output into a layer having the suffix "pool" followed by an identifier number.

The layers in the TLFFC model 210 having the suffix "pool" are pooling layers. A pooling layer can be used to down sample feature maps output from convolutional neural network layers (and passed through an activation function). Some example types of pooling layers include max pooling layers and average pooling layers. In a max pooling layer, a sliding window having a predetermined width and height is passed over the input data structure (e.g., a matrix or tensor). For each stride of the sliding window, the max pool layer generates an output value that is equal to the maximum value that is within the boundaries of the sliding window. The output value can be stored in an output data structure (e.g., a matrix or tensor) at a position corresponding to the position of the sliding window. An average pooling layer performs a similar approach, but instead of storing the maximum value at the output position in the output data structure, the average of the values within the boundary of the sliding window is calculated and provided as the output value. This process is repeated in the pooling layer until the sliding window has passed over each of the values of the input data structure, according to the predetermined stride of the sliding window.

The output of the first pooling layer is then provided to a second convolutional layer, which in some implementations can include different parameters (e.g., window size, input dimensions, etc.) than the first convolutional layer of the model. The second convolutional layer can also be followed by a second ReLU activation layer, which is provided as an input to a second pooling layer. Similarly, in some implementations, the second pooling layer can include different parameters from the first pooling layer (e.g., different type, window size, stride, etc.).

Then, as shown, the output of the second pooling layer is copied and input into five separate fully connected layers, each having the suffix "fc" and an identifier corresponding to the index of the output head. A fully connected neural network layer is a neural network layer having a predetermined number of neurons that each receive all of the output values in the output data structure of the previous layer. A neuron may be considered an indexed mathematical function in which a vector of input values are multiplied by a matrix of weight values. In some implementations, a bias value can be added to the product of the inputs and the weights to generate an output value. The weight values and the bias values can be adjusted by the computing device in a training process, such as a backpropagation technique in which a loss function is minimized. Each neuron in a fully connected layer provides an output value, which collectively with other neurons in the fully connected layer generate an output vector. As shown, each output head has a fully connected layer that provides the output vector to an "fcrelu" layer, which is a ReLU layer having dimensions that match the output of the respective fully connected layer that precedes it.

Each of the "fcrelu" layers feed into a respective output layer. In some implementations, the output layer is simply an identity layer that provides a respective output value. In some implementations, the output layer is a soft-max layer. A soft-max layer outputs a vector of probability values that each correspond to the likelihood that the input image maps to a given output class. Each head of the TLFFC model 210 can include its own set of output classes. For example, the intersection type output corresponds to the type of intersection depicted in the input frame 125, and can include classes that correspond to "not an intersection," "approaching intersection," "in the intersection," and "underpass." The crossing type output corresponds to the type of crossing detected (if an intersection is present), and can include classes that correspond to "none," "traffic light," "railroad," "warning light," and "tollbooth." The light for left turn output corresponds to a status of a left turn light in a detected intersection, and can include classes for "none," "red light," "yellow light," "green circle," "green arrow," "light turned off," and "not sure." In some embodiments, individual classes having the same color, such as "green circle" and "green arrow" may be combined into a single class. The light for right turn output corresponds to a status of a right turn light in a detected intersection, and can include classes for "none," "red light," "yellow light," "green light," "light turned off," and "not sure." The light for straight output corresponds to a status of a right turn light in a detected intersection, and can include classes for "none," "red light," "yellow light," "green light," "light turned off," and "not sure." Each class can be encoded by position in the output softmax vector of each output head. The output value "not sure" may be useful during the course of training data preparation. A human labeler may be uncertain, for example, about the state of a distant traffic light in an image, or a traffic light that is partially occluded, for example by a large vehicle in front of the vehicle. In these situations, the labeler might annotate the target value for one or more heads as "not sure." In operation, when the neural network computes a high value for a "not sure" output, it may be inferred that the visual scene is one for which a human perception system would itself be uncertain about the state of the corresponding aspect of the scene.

Figure 4A:
FIGS. 4A, 4B and 4C depict gradient-weighted class activation mapping (Grad-CAM) visualizations of processing performed by the full-frame classifier implemented by the system depicted in FIG. 1A, according to an embodiment.
Figure 4B:
Figure 4C:

Example Grad-CAM visualizations of the TLFFC model 210 are shown in FIGS. 4A, 4B, and 4C. Referring now to FIGS. 4A, 4B, and 4C, depicted are Grad-CAM visualizations of processing performed by the TLFFC model 210. A Grad-CAM visualization provides an indication of locations in an input image that correspond to one or more classes identified by the TLFFC model 210. A Grad-CAM visualization takes the form of a heatmap, where the highlighted portions correspond to regions in the image that are more likely to be determinative for predicting a specified class of outputs. As shown in FIG. 4A, the input image 405A is an image of an intersection with three lights 145 at nighttime. The image 405B is the same input image with the Grad-CAM heatmap associated with a prediction from the "left turn" output head, overlaid on top of the image. As shown in the image 405B, the highlighted regions are those that correspond to the traffic lights 145 and the crosswalk in front of the intersection (e.g., the presence of the intersection line).

FIG. 4B shows a similar Grad-CAM visualization. The input image 410A depicts a four-way intersection during the day with no intersection line, and in overcast weather. The Grad-CAM heatmap provided as an overlay on image 410B indicate the areas of interest in the image 410A that were analyzed by the TLFFC model 210 when classifying the image 410A. FIG. 4C shows a third Grad-CAM visualization of the input image 415A, which depicts a four-way intersection 140 during the day. As shown, the Grad-CAM heatmap is similarly concentrated around the traffic lights 145 in the overlay image 415B. In addition, the image 410A includes an intersection line at the bottom of the image, which is faintly highlighted in the Grad-CAM heatmap in the overlay image 415B.

Referring back to FIG. 2, when the computing device 115 propagates one of the sequence of frames 125 through the TLFFC model 210, the computing device 115 can store each of the output values (e.g., the type of output produced by the softmax layer, etc.) as part of an intersection status data structure. The intersection status data structure can be a vector or another type of data structure that includes an entry for each of the output heads of the TLFFC model 210. The computing device can store the intersection status data structure in association with the frame 125 from which the intersection status data structure was generated. This process can be repeated for each frame in the sequence of frames 125, and the intersection status data structure can be provided as input to the traffic light fusion logic 215.

The computing device 115 can detect and classify a set of features detected in each of the sequence of frames 125 using TLOC models 205. As shown in FIG. 2, the sequence of frames 125 can be provided as input to the TLOC models 205 and the TLFFC model 210 at the same time. Therefore, the operations of the TLOC models 205 and the TLFFC model 210 can be executed in parallel for each frame 125 as the frame 125 is received from the image capture device 135. In some implementations, the TLOC models 205 and the TLFFC model 210 can share one or more initial layers. In this sense, the TLOC models may be considered a first "head" and the TLFFC model may be considered a second "head." The individual heads of the TLFFC model may then refer to a second level of branching in the model. For example, each of the sequence of frames 125 may be preprocessed by providing each of the sequence of frames 125 as input to one or more neural network layers, such as convolutional neural network layers. The convolutional neural network layers can be, for example, a subset of the layers of a pre-trained image recognition model, such as an ImageNet model. In some implementations, the ImageNet model may be further trained using additional intersection-related training data, such as images of roadways that include labeled traffic lights 145 or other traffic indicators.

As described herein, the TLOC models 205 can include an object detection model and an object classification model, which are respectively trained to detect and classify regions of the frames 125. In some implementations, object detection model can share one or more initial layers with the TLFFC model 210. The computing device 115 can use the TLOC models 205 to detect the presence and location of traffic lights 145 in the sequence of frames 125. To process a frame 125 using the TLOC models 205, the computing device 115 can first input the frame 125 into an object detection model included as part of the TLOC models 205.

The object detection model can be any type of machine learning model that is trained to detect regions of a frame 125 that depict objects or features of interest, and output a bounding box or bounding region that surrounds the features of interest. A non-limiting example of an object detection model is a bounding box regression model. The object detection model can be trained, for example, on sets of training data, which includes labeled (e.g., with coordinates of regressed bounding boxes, etc.) images depicting features of interest, such as traffic lights 145. The object detection model can be trained using back-propagation techniques, such that the weights, biases, and other trainable parameters are trained iteratively to regress bounding boxes around features of interest. The object detection model can be trained to regress bounding boxes around traffic lights 145 in a frame 125. The object detection model can include a number of layers, such as fully connected layers, convolutional layers, or other types of neural network layers. In some implementations, a predetermined number of input layers of the object detection model can be shared with the TLFFC model 120. For example, in some implementations, the frame 125 can be preprocessed by propagating the frame through a series of frames 125 extracted from or based on an ImageNet model, as described herein.

The computing device 115 can propagate the frame 125 through the object detection model to identify coordinates of a bounding box or bounding region surrounding each detected traffic light 145 in the input frame 125. The computing device 115 can then extract a region (e.g., a subset of the pixels) of the frame 125 that falls within the bounding box. For example, the computing device 115 can extract each of the pixels that fall within a bounding box and store their color values in one or more data structures. Each of the one or more data structures can be stored in association with an identifier corresponding to the bounding region. Each extracted bounding region, which may include pixels that correspond to a traffic light 145, are then provided as input to an object classifier model included in the TLOC models 205.

As described herein, the TLOC models 205 can include an object classifier model, which is used to classify the objects in each bounding region extracted from the frame 125. An object classifier model can be, for example, a CNN that accepts the extracted bounding regions of the frame 125 output by the object detection model, and classifies the traffic light 145 in the extracted bounding region. To classify the traffic light 145 in the bounding region, the computing device 115 can propagate each of the bounding regions (e.g., by iterating through each of the identifiers associated with the extracted bounding regions) through the object classification model to generate a respective output label. The output label can include an indication of the presence of a traffic light 145 and the status of the traffic light 145, if present. Some non-limiting examples of a traffic light status can include a green circle light, a green left arrow light, a green right arrow light, a red circle light, or a yellow light, among others.

The object classification model can be trained using labeled training data, which can include images of traffic lights 145 or other traffic features and corresponding labels indicating the presence and status of the traffic light 145 in the training image. The object classification model can be trained using back-propagation techniques, such that the weights, biases, and other trainable parameters of the model are trained iteratively to classify the presence and status of a traffic light 145 in an image or region of frame 125. The object classification model can include one output head culminating in an output layer. In some implementations, the output layer of the object classification model can be a softmax layer, which can output a vector of probability values having coordinates that each correspond to a presence and a status of the traffic light 145 or other traffic feature. Each status of the traffic light 145 or traffic feature can be encoded by coordinate position in the output vector. If the computing device 115 detects the presence and status of a traffic light 145 in the frame using the TLOC models 205, the computing device 115 can provide the indication of the presence and status of the traffic light 145 to the traffic light fusion logic 215.

Using the traffic light fusion logic 215, the computing device 115 can detect an intersection crossing event based on the intersection status data structure output by the TLFFC model 210 and the presence and status of traffic lights 145 output by the TLOC models 205. The traffic light fusion logic 215 can be a set of rules applied to the outputs of the TLOC models 205 and the TLFFC models 210 to determine whether an intersection crossing has occurred, and whether the intersection crossing may have been in violation of one or more predetermined traffic regulations. In some implementations, to detect a potential intersection crossing, the traffic light fusion logic 215 can analyze the outputs from the TLOC models 205 and the TLFFC model 210 from a predetermined number of consecutive frames. For example, the traffic light fusion logic 215 can execute over the outputs from the TLOC models 205 and the TLFFC model 210 for at least three consecutive frames.

The outputs from the TLOC models 205 and the TLFFC models 210 can be applied to a finite state machine, such as a hidden Markov model (HMM). An HMM is a probabilistic graphical state model that can be used to predict unknown variables, such as whether an intersection crossing has occurred, from a set of observable variables, such as the color or status of traffic lights 145 across a sequence of consecutive frames 125. The transition matrix for the HMM can be generated in an offline process by analyzing many sequences of consecutive images that depict intersection crossing events, for example, using the Baum-Welch algorithm.

To detect an intersection crossing event using the HMM, the computing device 115 can monitor the outputs of the TLOC models 205 and the TLFFC model 210. In an initial state where the vehicle 110 is not driving through an intersection 140 but along a stretch of road, the output of the TLFFC should indicate that no intersection 140 is detected. Once the TLOC models detects and track the presence and status of traffic lights 145 for at least three consecutive frames 125 (e.g., the frames 125a, 125b, and 125c), the traffic light fusion logic 215 can determine the presence of the intersection 140 for each of the frames 125 by accessing the intersection status data structure for each of the frames. If the TLFFC model 210 outputs "no intersection detected" for each of the three frames 125, it could be that the vehicle 110 is too far away to be considered approaching the intersection 140. Thus, traffic light violations will not be generated (or may be generated then suppressed) at these times.

Once the TLFFC model 210 outputs an intersection status data structure for one of the sequence of frames 125 that indicates the vehicle 110 is approaching the intersection 140, the traffic light fusion logic 215 can input data from the TLOC models 205 as an initial state of the HMM. For example, the computing device 115 can input the status and presence of any traffic lights 145 detected by the TLOC models 205 as initial observation values of the HMM. As additional frames 125 in the sequence are captured by the capture device 135 and provided to the computing device 115, the computing device 115 can continue to input the outputs of the TLOC models 205 as observed values to the HMM model. The HMM can be used to generate a probability that the vehicle 110 has passed through an intersection 140, and whether the vehicle 110 has violated any traffic regulations when doing so. If the output probability exceeds a predetermined threshold, the traffic light fusion logic 215 can indicate a potential intersection crossing event has occurred.

Using the output intersection status data structure for each of the sequence of frames 125 used for the HMM, the traffic light fusion logic 215 can validate the potential intersection crossing event. For example, if the intersection status data structures for each of the sequence of frames 125 used to generate input to the HMM indicate that the intersection type transitioned from "approaching intersection" to "in the intersection," and the crossing type is "traffic light," the traffic light fusion logic 215 can determine that an intersection crossing event occurred. In this example, the determination could be based on TLFFC outputs alone. In addition, the traffic light fusion logic 215 can use the output from TLFFC model 210 to determine whether the intersection crossing event is a false positive. For example, if the intersection type for each of the sequence of frames 125 indicates the intersection type is an "underpass," then the lights detected by the TLOC models 205 are not for the roadway on which the vehicle is traveling, and can be safely ignored. Likewise, if the intersection status data structures indicate the crossing type is "none," "railroad," "warning light," or "tollbooth," the traffic light fusion logic 215 can determine that the potential intersection crossing event is a false positive.

When the traffic light fusion logic 215 determines that a potential intersection crossing light event is a false positive, the traffic light fusion logic 215 can suppress the warning signal corresponding to the potential intersection crossing event. For example, instead of generating a corresponding traffic event alert 220 with a degree of severity, the traffic light fusion logic 215 can forego generating a traffic event alert 220. In some implementations, the traffic light fusion logic 215 may generate a traffic event alert 220, but suppress any indication of a warning by including an indication in the traffic event alert 220 that the TLFFC model 210 detected that the traffic event alert 220 is a false warning.

In some implementations, the traffic light fusion logic 215 can rely solely on the output of the TLFFC model 210 to determine whether an intersection crossing event occurred. For example, in some circumstances, the TLFCC model 210 may outperform the TLOC models 205 with respect to overall accuracy, such as in low light environments. The traffic light fusion logic 215 can receive signals from a light sensor mounted on the vehicle, and determine that the overall level of light is below a predetermined threshold level of light (e.g., nighttime, very low light or visibility, etc.). Likewise, the traffic light fusion logic may more heavily weight the inputs from TLFFC over TLOC (or vice versa) depending on the time of day. In some implementations, the traffic light fusion logic 215 may compute an overall level of light based on the level of light represented in each of the sequence of frames 125. When the overall level of light is below a predetermined threshold, the traffic light fusion logic 215 may rely solely on the intersection status data structures generated by the TLFFC model 210 to detect intersection crossing events. In doing so, the traffic light fusion logic 215 can monitor intersection status data structures until a frame 125 is indicated as "approaching an intersection." The traffic light fusion logic 215 can then continue to monitor the sequence of frames 125 and output a traffic event alert 220 if a violation is detected. For example, one or more of the frames 125 may be classified as having an intersection type of "approaching the intersection" and may further include an indication of a red light in the head corresponding to the direction that the vehicle travelled through the intersection.

In some implementations, the traffic light fusion logic 215 receives additional data from other sensors on the vehicle 110, in addition to the outputs of the TLOC models 205 and the TLFFC model 210. For example, the traffic light fusion logic 215 can detect intersection crossing events further based on data captured by a GPS receiver in the vehicle 110. The GPS receiver data can be correlated (e.g., by timing, etc.) to each of the sequence of frames 125, such that the approximate location of the vehicle is known for each of the sequence of frames. After an intersection crossing event is detected, the position of the vehicle 110 can be monitored and associated (e.g., by closest approximate distance, etc.) with a particular intersection 140 in map data, to determine the direction the vehicle 110 passed through the intersection (e.g., left turn, right turn, straight, etc.). Alternatively, GPS heading or inertial sensor data may be used to determine whether the driver turned left or right. From this information, and the information in the intersection status data structure for the frame 125 having an "intersection type" of "in the intersection," the computing device can determine whether the vehicle violated a traffic regulation. For example, if the positional data indicates that the vehicle 110 made a left turn through an intersection 140, and the intersection status data structure for each frame 125 in the sequence of frames 125 indicates that the "light for left turn" is classified as a "red light," the traffic light fusion logic 215 can output a severe intersection crossing event as a traffic alert 220.

The traffic event alerts 220 output by the traffic light fusion logic 215 can include varying degrees of severity, which can be determined based on the color of the traffic lights 145 in each of the sequence of frames 125. In addition, the traffic event alerts 220 can include the information in the intersection status data structures generated by the TLFFC model 210 for the sequence of frames 125, to indicate the details of the intersection crossing event. In a non-limiting example, if the traffic light fusion logic 215 determines that the vehicle 110 has passed through an intersection 140 with a yellow light, a traffic event alert 220 may be generated with a lowest level of severity. In contrast, if the traffic light fusion logic 215 determines that the vehicle 110 has passed through an intersection 140 in which each frame 125 from the frame 125 classified by the TLFFC model 210 as "approaching the intersection" to the frame 125 classified by the TLFFC model 210 as "in the intersection" includes a red light, a traffic event alert 220 may be generated with the highest level of severity. Other severity levels are also possible, such as medium severity alerts. The severity of the traffic event alerts 220 can be a function of the number of frames 125 in the sequence preceding the frame 125 classified as "in the intersection" that include a red light that is relevant to the vehicle 110 (e.g., assigned to the same lane as the vehicle 110). The traffic event alerts 220, therefore, can be considered warning signals relating to intersection crossing events detected by the artificial intelligence models 130.

Once one or more traffic event alerts 220 are generated by the traffic light fusion logic 215, the computing device 115 can transmit the traffic event alerts 220 to a recording device, such as an external computing device. In some implementations, the computing device 115 can transmit the sequence of frames 125 that were used to generate the traffic event alert 220 to the external computing device. The external computing device, or the computing device 115 in the vehicle 110, can store the one or more traffic event alerts 220 in association with the sequence of frames 125 that were used to generate the traffic event alert 220. The traffic event alerts 220 can be stored in association with an identifier of the driver of the vehicle 110, an identifier of the vehicle 110 (e.g., license plate number, vehicle identification number (VIN), etc.), GPS data corresponding to the intersection crossing event, vehicle status information corresponding to the intersection crossing event, a timestamp corresponding to the intersection crossing event, or any combination thereof. The traffic event alerts 220 can be transmitted to the external computing device via one or more communication interfaces, as described herein. In some implementations, the traffic event alerts 220 can be transmitted to an alert device within the vehicle 110, such as a warning light or another type of alert device.

FIG. 5 illustrates a flow of a method 500 executed in a system (e.g., the intersection detection system 105, etc.) for classifying traffic indicators to detect intersection crossings by a vehicle, in accordance with an embodiment. The method 500 includes steps 505-520. However, other embodiments may include additional or alternative steps, or may omit one or more steps altogether. The method 500 is described as being executed by a computing device, such as the computing device 115 described herein above.

At step 505, the computing device (e.g., the computing device 115) can receive a sequence of frames (e.g., the frames 125) captured by a capture device (e.g., the image capture device 135, etc.) mounted to a vehicle (e.g., the vehicle 110, etc.). As described herein above, the computing device can receive each frame in the sequence as it is captured by the capture device, and utilize artificial intelligence models (e.g., the artificial intelligence models 130). The sequence of frames received by the method 500 can be computed iteratively each time a new frame is captured by the image capture device. The sequence of frames can include any number of consecutive frames captured by the image capture device.

At step 510, the computing device can generate an intersection data structure for each frame in the sequence of frames using a full-frame classification model (e.g., the TLFFC model 210). The TLFFC model may be a convolution neural network model that may include at least five output heads (for which the final layers are sometimes referred to as output layers). The TLFFC model can take, as input, a frame of the sequence of frames. Because the TLFFC model is a feedforward neural network, the computing device can generate an output classification at each of the output heads by propagating the input frame through each layer of the TLFFC model. The computing device can use each of the outputs of the TLFFC model to populate an intersection status data structure, which includes values that describe the characteristics of an intersection, if present, in the frame provided as input to the TLFFC model. The structure of the TLFFC model is described herein in connection with FIG. 3.

When the computing device propagates one of the sequence of frames through the TLFFC model, the computing device can store each of the output values (e.g., the type of output produced by the softmax layer, etc.) as part of an intersection status data structure. The intersection status data structure can be a vector or another type of data structure that includes an entry for each of the output heads of the TLFFC model. The computing device can store the intersection status data structure in association with the frame from which the intersection status data structure was generated. This process can be repeated for each frame in the sequence of frames as the frames are captured by the image capture device.

At step 515, the computing device can classify a set of features detected in each frame of the sequence of frames using an object detection model. To do so, the computing device can provide the sequence of frames as input to TLOC models (e.g., the TLOC models). In some implementations, step 515 can be executed in parallel with step 510 (e.g., the frames can be input to the TLFFC model and the TLOC models at the same time). The TLOC models can include an object detection model and an object classification model, which are respectively trained to detect and classify regions of the frames that include traffic lights or other relevant traffic indicators. In some implementations, object detection model can share one or more initial layers with the TLFFC model. The computing device can use the TLOC models to detect the presence and location of traffic lights in the sequence of frames. Similar to the TLFFC model, the TLOC models can be used to process and classify each frame as it received by the image capture device. To process a frame using the TLOC models, the computing device can first input the frame into an object detection model included as part of the TLOC models.

The object detection model can be any type of machine learning model that is trained to detect regions of a frame that depict objects or features of interest, and output a bounding box or bounding region that surrounds the features of interest. A non-limiting example of an object detection model is a bounding box regression model. The object detection model can be trained to regress bounding boxes around traffic lights in a frame. The computing device can propagate the frame through the object detection model to identify coordinates of a bounding box or bounding region surrounding each detected traffic light in the input frame. The computing device can then extract a region (e.g., a subset of the pixels) of the frame that falls within the bounding box. Each of the one or more data structures can be stored in association with an identifier corresponding to the bounding region. Each extracted bounding region, which may include pixels that correspond to a traffic light, are then provided as input to an object classifier model.

The object classifier model is used to classify the objects in each bounding region extracted from each of the sequence of frames. The object classifier model can be, for example, a CNN that accepts the extracted bounding regions of the frame output by the object detection model, and classifies the traffic light in the extracted bounding region. To classify the traffic light in the bounding region, the computing device can propagate each of the bounding regions (e.g., by iterating through each of the identifiers associated with the extracted bounding regions) through the object classification model to generate a respective output label. The output label can include an indication of the presence of a traffic light and the status of the traffic light, if present.

At step 520, the computing device can detect an intersection crossing event based on the intersection status data structure output by the TLFFC model and the presence and status of traffic lights output by the TLOC models. To detect a potential intersection crossing, the computing device can analyze the outputs from the TLOC models and the TLFFC model from a predetermined number of consecutive frames. For example, the computing device can analyze the outputs from the TLOC models and the TLFFC model for at least three consecutive frames. In doing so, the computing device can apply the outputs from the TLOC models and the TLFFC models to a finite state machine, such as an HMM. An HMM is a probabilistic graphical state model that can be used to predict unknown variables, such as whether an intersection crossing has occurred, from a set of observable variables, such as the color or status of traffic lights across a sequence of consecutive frames. The transition matrix for the HMM can be generated in an offline process by analyz-ing many sequences of consecutive images that depict intersection crossing events, for example, using the Baum-Welch algorithm.

To detect an intersection crossing event using the HMM, the computing device can monitor the outputs of the TLOC models and the TLFFC model. In an initial state where the vehicle is not driving through an intersection but along a stretch of road, the output of the TLFFC model should indicate that no intersection is detected. Once the TLOC models detect and track the presence and status of traffic lights for at least three consecutive frames, the computing device can determine the presence of the intersection for each of the frames by accessing the intersection status data structure for each of the frames. If the TLFFC model outputs "no intersection detected" for each of the three frames, it could be that the vehicle is too far away to be considered approaching the intersection.

Once the TLFFC models output an intersection status data structure for one of the sequence of frames that indicates the vehicle is approaching the intersection, the computing device can input data from the TLOC models as an initial state of the HMM. For example, the computing device can input the status and presence of any traffic lights detected by the TLOC models as initial observation values of the HMM. As additional frames in the sequence are captured by the capture device and provided to the computing device, the computing device can continue to input the outputs of the TLOC models as observed values to the HMM model. The HMM can be used to generate a probability that the vehicle has passed through an intersection, and whether the vehicle has violated any traffic regulations when doing so. If the output probability exceeds a predetermined threshold, the computing device can indicate that a potential intersection crossing event has occurred.

Using the output intersection status data structure for each of the sequence of frames used for the HMM, the computing device can validate the potential intersection crossing event. For example, if the intersection status data structures for each of the sequence of frames used to generate input to the HMM indicate that the intersection type transitioned from "approaching intersection" to "in the intersection," and the crossing type is "traffic light," the computing device can determine that an intersection crossing event occurred. In addition, the computing device can use the output from TLFFC model to determine whether the intersection crossing event is a false positive. For example, if the intersection type for each of the sequence of frames indicates the intersection type is an "underpass," then the traffic lights detected by the TLOC models do not control traffic the roadway on which the vehicle is traveling, and can be safely ignored. Likewise, if the intersection status data structures indicate the crossing type is "none," "railroad," "warning light," or "tollbooth," the computing device can determine that the potential intersection crossing event is a false positive. If the intersection crossing event is validated, the computing device can generate a traffic event alert.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The operations described in this specification can be implemented as operations performed by a data processing apparatus on data stored on one or more computer-readable storage devices or received from other sources.

The terms "data processing apparatus", "data processing system", "client device", "computing platform", "computing device", "user device", or "device" can encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, a digital camera device, a video camera device, or a portable storage device (e.g., a universal serial bus (USB) flash drive), for example. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user; a keyboard; and a pointing device, e.g., a mouse, a trackball, or a touchscreen, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices described herein can each be a single module, a logic device having one or more processing modules, one or more servers, or an embedded computing device.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for classifying traffic indicators to detect intersection crossings by a vehicle, the method comprising:
   receiving, by one or more processors coupled to a memory, a sequence of frames captured by an image capture device mounted to the vehicle;
   generating, by the one or more processors, an intersection status data structure for each frame in the sequence of frames using a full-frame classification model trained on a labeled dataset of frames depicting roadways, wherein each label of the labeled dataset used to train the full-frame classification model is applied to a full image frame;
   classifying, by the one or more processors, using an object detection model, a set of features detected in each frame of the sequence of frames; and
   detecting, by the one or more processors, an intersection crossing event based on the intersection status data structure of each frame and the classification of each of the set of features detected in each frame.

2. The method of claim 1, wherein the full-frame classification model comprises at least five outputs, and wherein generating the intersection status data structure for each frame further comprises generating, by the one or more processors, the intersection status data structure to include at least five output values for each frame by providing each frame as input to the full-frame classification model.

3. The method of claim 2, wherein the at least five outputs comprise an intersection type output, a crossing type output, a left-turn light output, a right-turn light output, and a forward light output.

4. The method of claim 1, further comprising transmitting, by the one or more processors, a warning signal to an alert device responsive to detecting, based on the intersection status data structure, that the vehicle is approaching an intersection.

5. The method of claim 1, further comprising:
   determining, by the one or more processors, based on the intersection status data structure, that the intersection crossing event is a false positive; and
   suppressing, by the one or more processors, a warning signal responsive to determining that the intersection crossing event is a false positive.

6. The method of claim 5, wherein determining that the intersection crossing event is a false positive further comprises determining, based on the intersection status data structure, that the detected intersection crossing event corresponds to an underpass.

7. The method of claim 1, wherein detecting the intersection crossing event is further based on data captured by a global-positioning system receiver.

8. The method of claim 1, wherein detecting the intersection crossing event further comprises:
   detecting, by the one or more processors, a potential intersection crossing event based on the classification of each of the set of features detected in each frame; and
   validating, by the one or more processors, the potential intersection crossing event using the intersection status data structure.

9. The method of claim 8, wherein the sequence of frames comprises at least three frames, and wherein detecting the potential intersection crossing event comprises determining the classification of a feature detected in the at least three frames remains constant.

10. The method of claim 1, wherein classifying the set of features detected in each frame of the sequence of frames further comprises:
    detecting, by the one or more processors, one or more bounding regions that each correspond to a respective feature in each frame; and
    classifying, by the one or more processors, the set of features by providing the one or more bounding regions of each frame as input to the object detection model.

11. A system for classifying traffic indicators to detect driving violations by a vehicle, the system comprising one or more processors coupled to a non-transitory memory, the one or more processors configured to:
    receive a sequence of frames captured by an image capture device mounted to the vehicle;
    detect, using an object detection model, a potential intersection crossing event based on a set of features detected in each frame of the sequence of frames;
    generate an intersection status data structure for each frame in the sequence of frames, using a full-frame classification model trained on a labeled dataset of frames depicting roadways, wherein each label of the labeled dataset used to train the full-frame classification model is applied to a full image frame; and
    validate the potential intersection crossing event based on the intersection status data structure generated using the full-frame classification model.

12. The system of claim 11, wherein the one or more processors are further configured to detect the potential intersection crossing event by performing operations comprising:
    classifying a feature of the set of features detected in the sequence of frames as a traffic light;
    determining that the vehicle has passed the feature detected in the sequence of frames; and
    detecting the potential intersection crossing event responsive to determining that the vehicle has passed the feature classified as the traffic light.

13. The system of claim 12, wherein the one or more processors are further configured to:
    generate the intersection status data structure to include an indication that the vehicle is approaching an intersection or in the intersection when the traffic light is red; and
    determine a severity of the potential intersection crossing event based on the indication that the vehicle is approaching the intersection or in the intersection when the traffic light is red.

14. The system of claim 11, wherein the one or more processors are further configured to transmit a warning signal to an alert device responsive to validating the potential intersection crossing event.

15. The system of claim 11, wherein the one or more processors are further configured to determine, based on a second intersection status data structure generated by the full-frame classification model using a second sequence of frames, that a second potential intersection crossing event is a false positive.

16. The system of claim 15, wherein the one or more processors are further configured to
    determine that the second potential intersection crossing event is a false positive by performing operations comprising determining, based on the second intersection status data structure, that the second potential intersection crossing event corresponds to at least one of an underpass, a toll booth, a warning signal, or a railroad crossing.

17. The system of claim 11, wherein the one or more processors are further configured to detect the potential intersection crossing event further based on data captured by a global-positioning system receiver.

18. The system of claim 11, wherein the one or more processors are further configured to detect the potential intersection crossing event based on a classification of each of the set of features across each frame in the sequence of frames and a finite-state machine.

19. The system of claim 18, wherein the sequence of frames comprises at least three frames, and wherein the one or more processors are further configured to detect the potential intersection crossing event based on a transition matrix of the finite-state machine.

20. A method for classifying road images captured by an image capture device mounted to a vehicle, comprising:
    receiving, by one or more processors coupled to a memory, a sequence of frames captured by the capture device mounted to the vehicle;
    generating, by the one or more processors, using a full-frame classification model having a plurality of heads trained on a labeled dataset of frames depicting roadways, a plurality of output probability values for each frame in the sequence of frames, each of the plurality of output probability values indicating a probability that each frame corresponds to a respective output class for each output class defined within one of the plurality of heads; and
    detecting, by the one or more processors, an intersection crossing event based on the plurality of output probability values of the sequence of frames.

* * * * *